US012643522B2

(12) United States Patent
Shin et al.

(10) Patent No.: US 12,643,522 B2
(45) Date of Patent: Jun. 2, 2026

(54) BRAKE APPARATUS FOR VEHICLE

(71) Applicants: HYUNDAI MOBIS CO., LTD., Seoul (KR); INFAC, Suwon-si (KR)

(72) Inventors: Choong Sik Shin, Yongin-si (KR); Jong Hun Park, Suwon-si (KR); Taek Jin Jang, Suwon-si (KR)

(73) Assignees: HYUNDAI MOBIS CO., LTD., Seoul (KR); INFAC, Suwon-si (KR)

( * ) Notice: Subject to any disclaimer, the term of this patent is extended or adjusted under 35 U.S.C. 154(b) by 616 days.

(21) Appl. No.: 18/067,222

(22) Filed: Dec. 16, 2022

(65) Prior Publication Data

US 2023/0286484 A1    Sep. 14, 2023

(30) Foreign Application Priority Data

Mar. 11, 2022    (KR) ......................... 10-2022-0030859

(51) Int. Cl.
*F16D 69/00*        (2006.01)
*B60T 13/74*        (2006.01)
        (Continued)

(52) U.S. Cl.
CPC ............ *B60T 13/746* (2013.01); *F16D 65/18* (2013.01); *F16D 2121/24* (2013.01);
        (Continued)

(58) Field of Classification Search
CPC ............. F16D 2127/06; F16D 2121/24; F16D 2125/40; F16D 2125/46; F16D 2125/48
See application file for complete search history.

(56) References Cited

U.S. PATENT DOCUMENTS 10,253,834 B2 *    4/2019    Lee .......................... F16D 65/18
11,982,350 B2 *    5/2024    Stoehr ..................... B60T 7/104
        (Continued)

FOREIGN PATENT DOCUMENTS

KR    10-2010-0098846 A    9/2010
KR    10-2016-0011283 A    2/2016
        (Continued)

OTHER PUBLICATIONS

Machine translation of KR 20190043713 (no date).*
Office Action issued on Feb. 2, 2026 in the corresponding Korean Patent Application No. 10-2022-0030859.

*Primary Examiner* — Nicholas J Lane
(74) *Attorney, Agent, or Firm* — NovoTechIP International PLLC

(57)        ABSTRACT

A brake apparatus for a vehicle may include: a drive unit configured to generate a rotational force in forward and reverse directions, a piston unit configured to be moved forward and backward in conjunction with the rotational force generated from the drive unit, a transfer gear unit configured to transfer the rotational force generated from the drive unit to the piston unit, a parking gear unit configured to be rotated together with the transfer gear unit, a locking unit arranged in a manner that faces the parking gear unit, fastened to the parking gear unit when braking for parking is performed, thereby limiting a rotation of the parking gear unit and an unlocking unit separating the parking gear unit and the locking unit from each other when the rotational force is generated in the reverse direction from the drive unit.

7 Claims, 22 Drawing Sheets

(51) Int. Cl.

| | |
|---|---|
| F16D 65/18 | (2006.01) |
| F16D 121/24 | (2012.01) |
| F16D 125/40 | (2012.01) |
| F16D 125/48 | (2012.01) |
| F16D 125/50 | (2012.01) |
| F16D 127/06 | (2012.01) |

(52) U.S. Cl.
CPC ...... *F16D 2125/40* (2013.01); *F16D 2125/48* (2013.01); *F16D 2125/50* (2013.01); *F16D 2127/06* (2013.01)

(56) References Cited

U.S. PATENT DOCUMENTS

| | | | | |
|---|---|---|---|---|
| 2005/0217952 | A1* | 10/2005 | Usui | F16D 65/18 188/162 |
| 2016/0017942 | A1* | 1/2016 | Kwon | F16D 65/18 188/162 |
| 2017/0114848 | A1* | 4/2017 | Park | B60T 13/741 |
| 2018/0073584 | A1* | 3/2018 | Tsukamoto | F16D 63/006 |
| 2018/0135710 | A1* | 5/2018 | Sala | B60T 13/741 |
| 2022/0001847 | A1* | 1/2022 | Masuda | F16D 55/02 |
| 2022/0024426 | A1* | 1/2022 | Baek | F16D 65/18 |
| 2022/0105919 | A1* | 4/2022 | Masuda | B60T 7/107 |

FOREIGN PATENT DOCUMENTS

| | | | | |
|---|---|---|---|---|
| KR | 10-2018-0128167 | A | 1/2019 | |
| KR | 20190043713 | A * | 4/2019 | F16D 65/18 |

* cited by examiner

BRAKE APPARATUS FOR VEHICLE

CROSS-REFERENCE TO RELATED APPLICATIONS

This application claims priority from and the benefit of Korean Patent Application No. 10-2022-0030859, filed on Mar. 11, 2022, which is hereby incorporated by reference for all purposes as if set forth herein.

TECHNICAL FIELD

The present disclosure relates to a brake apparatus for a vehicle and, more particularly, to a brake apparatus for a vehicle capable of generating a braking force by converting a force exerted to a pedal by a driver into an electrical signal.

BACKGROUND

Usually, a brake apparatus for a vehicle stops or slows down a vehicle using a frictional force between a pad and a disc that is produced by pushing a piston with a drive force and thus brings the pad and the disc into close contact with each other.

Among these brakes, an electro-mechanical brake (EMB) system is a device in which a motor-driven actuator is directly mounted in a caliper and thus presses against the piston through mechanisms, such as a gear or a screw, without using hydraulic pressure. The EMB system is capable of performing active braking and wheel-based independent braking and thus realizing additional functions, such as ABS, ESC, TCS, and ABEL, as well as usual service braking, without causing a hydraulic transmission delay. Accordingly, the EMB system advantageously provides higher performance.

An EMB in the related art provides high efficiency and quick responsiveness of the piston through a ball screw. However, due to its structural characteristics, it is impossible for the ball screw to perform self-locking that can limit its rotation. Thus, in a case where the supplying of electric power by a motor is interrupted, there occurs a problem in that the braking force is arbitrarily canceled due to reaction forces of the pad and the piston.

In order to solve this problem, there is additionally provided an EPB structure in which a service brake exerts the braking force and then a parking brake keeps the vehicle in a state of braking for parking. However, among these ECB structures, in the case of an EPB structure in which a solenoid is used, when the vehicle is left unattended for an extended period of time after parking, a braking force for parking is absent because a battery, a capacitor, or the like is discharged. Moreover, when vibration occurs while the vehicle travels on a rough road, there is a concern that a malfunction will occur. In the case of an EPB structure in which a motor is used, when the motor fails to operate, it is impossible to keep the vehicle out of the state of braking for parking. Thus, there occurs a problem in that a brake disc needs to be replaced in addition to a brake.

An example of the related art is disclosed in Koran Patent Application Publication No. 10-2010-0098846 (published on Sep. 10, 2010, entitled "Disc Brake Having Parking Function").

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present disclosure is to provide a brake apparatus for a vehicle capable of stably maintaining a state of braking for parking.

Another object of the present disclosure is to provide a brake apparatus for a vehicle capable of forcefully keeping a vehicle out of a state of braking for parking when a motor or the like fails to operate after the braking for parking is performed.

In an embodiment, a brake apparatus for a vehicle including: a drive unit configured to generate a rotational force in forward and reverse directions; a piston unit configured to be moved forward and backward in conjunction with the rotational force generated from the drive unit; a transfer gear unit configured to transfer the rotational force, generated from the drive unit, to the piston unit; a parking gear unit configured to be rotated together with the transfer gear unit; a locking unit arranged in a manner that faces the parking gear unit, fastened to the parking gear unit when braking for parking is performed, thereby limiting a rotation of the parking gear unit; and an unlocking unit separating the parking gear unit and the locking unit from each other when the rotational force is generated in the reverse direction from the drive unit.

Furthermore, the parking gear unit may include: a parking gear body connected to a first output shaft of the drive unit, thereby being rotated; and a plurality of parking protrusion protruding toward a radial direction of the parking gear body and arranged in such a manner as to be spaced apart along a circumferential direction of the parking gear body.

Furthermore, the parking gear body and the first output shaft may be coaxially arranged.

Furthermore, the locking unit may include: a parking drive unit arranged in a manner that is spaced away from the parking gear body and configured to generate a rotational force; a screw member being supplied with the rotational force from the parking drive unit, thereby being rotated; a locking rod being moved forward and backward in a direction in parallel with the radial direction of the parking gear body in conjunction with the rotation of the screw member; and a locking member extending from the locking rod and being fastened to or separated from the parking protrusion according to a movement direction of the locking rod.

Furthermore, the locking unit may further include a stopper being brought into contact with the locking rod, thereby limiting a rotation of the locking rod.

Furthermore, the parking drive unit may be installed in a manner that is slidably movable in a direction in parallel with the movement direction of the locking rod, and the unlocking unit may be provided in a manner that is expandable and contractable in a longitudinal direction thereof, may be connected to the parking drive unit, and may press against the parking drive unit toward the parking gear unit.

Furthermore, when the rotational force is generated in the reverse direction from the drive unit, the unlocking unit may contract in the longitudinal direction thereof and moves the parking drive unit away from the parking gear unit.

Furthermore, the locking rod may include: a first rod connected with the screw member, rotational motion of the screw member being converted into linear reciprocating motion of the first rod; and a second rod installed in a manner that is slidably movable along a longitudinal direction of the first rod, wherein the unlocking unit may be provided in a manner that is expandable and contractable in a longitudinal direction thereof, may be installed between the first rod and the second rod, and may press against the second rod toward the parking gear unit.

Furthermore, when the rotational force is generated in the reverse direction from the drive unit, the unlocking unit may contract in the longitudinal direction thereof and may move the second rod away from the parking gear unit.

Furthermore, the parking gear unit may further include a plurality of first saw-toothed portions protruding toward an axial direction of the parking gear body and arranged in such a manner as to be spaced apart along the circumferential direction of the parking gear body.

Furthermore, the unlocking unit may include: a locking limitation body connected to the first output shaft, thereby being rotated, and supports the parking gear body in a manner that is slidably movable in a direction in parallel with a longitudinal direction of the first output shaft; a plurality of second saw-toothed portions protruding toward an axial direction of the locking limitation body and being combined with the plurality of first saw-toothed portions, respectively by being engaged therewith, respectively; and a pressing unit pressing against the parking gear body toward the locking limitation body.

Furthermore, when the drive unit generates the rotational force in the reverse direction in a state where the parking protrusion is brought into contact with the locking member, the second saw-toothed portion may be disengaged from the first saw-toothed portions and may separate the parking protrusion and the locking member from each other.

Furthermore, each of the first saw-toothed portion and the second saw-toothed portion may be formed in such a manner that a width thereof becomes smaller toward an end thereof.

Furthermore, each of the first saw-toothed portion and the second saw-toothed portion is formed in such a manner that both lateral surfaces thereof are inclined at a predetermined angle with respect to the longitudinal direction of the first output shaft.

Furthermore, the pressing unit may be provided in a manner that is expandable and contractable in a direction in parallel with the longitudinal direction of the first output shaft, and may be installed between a pressing sheet connected with the first output shaft and the parking gear body.

Furthermore, the piston unit may include: a ball screw being rotated in conjunction with a rotation of the transfer gear unit; a ball nut connected to the ball screw and reciprocating in a straight line along a rotational direction of the ball screw; and one or more balls provided between the ball screw and the ball nut and brought into rolling contact with the ball screw and the ball nut.

In the brake apparatus for the vehicle according to the present disclosure, although the drive unit no longer operates when the braking for parking is performed, the locking unit can prevent the piston unit from being arbitrarily separated from a pad unit and thus can prevent the absence of the braking force.

Furthermore, the brake apparatus for the vehicle according to the present disclosure, the parking gear unit is connected to the first output shaft, and thus is rotated at the same angular speed as the first transfer gear. A magnitude of a load that is exerted on the locking unit can be decreased when compared with a case where the parking gear unit is connected to a second transfer gear or a planetary gear unit that has a magnitude of the rotational force that is increased according to a gear ratio.

Furthermore, the brake apparatus for the vehicle according to the present disclosure, when the braking for parking is no longer operative due to the failure of the parking drive unit to operate, in a case where the locking rod is impossible to move smoothly forward and backward, the unlocking unit forcefully separates the parking protrusion and the locking member from each other using the rotational force in the reverse direction that is generated from the drive unit. Accordingly, it is possible that a vehicle is made to travel without performing an operation of removing and replacing a defective component.

BRIEF DESCRIPTION OF THE DRAWINGS

FIG. 1 is a perspective view schematically illustrating a configuration of a brake apparatus for a vehicle according to a first embodiment of the present disclosure.

FIG. 6 is an exploded perspective view schematically illustrating a configuration of a planetary gear unit according to the first embodiment of the present disclosure.

FIG. 13 is a perspective view schematically illustrating a configuration of a brake apparatus for a vehicle according to a second embodiment of the present disclosure.

FIG. 20 is a perspective view schematically illustrating a configuration of a brake apparatus for a vehicle according to a third embodiment of the present disclosure.

5

Figure 21:
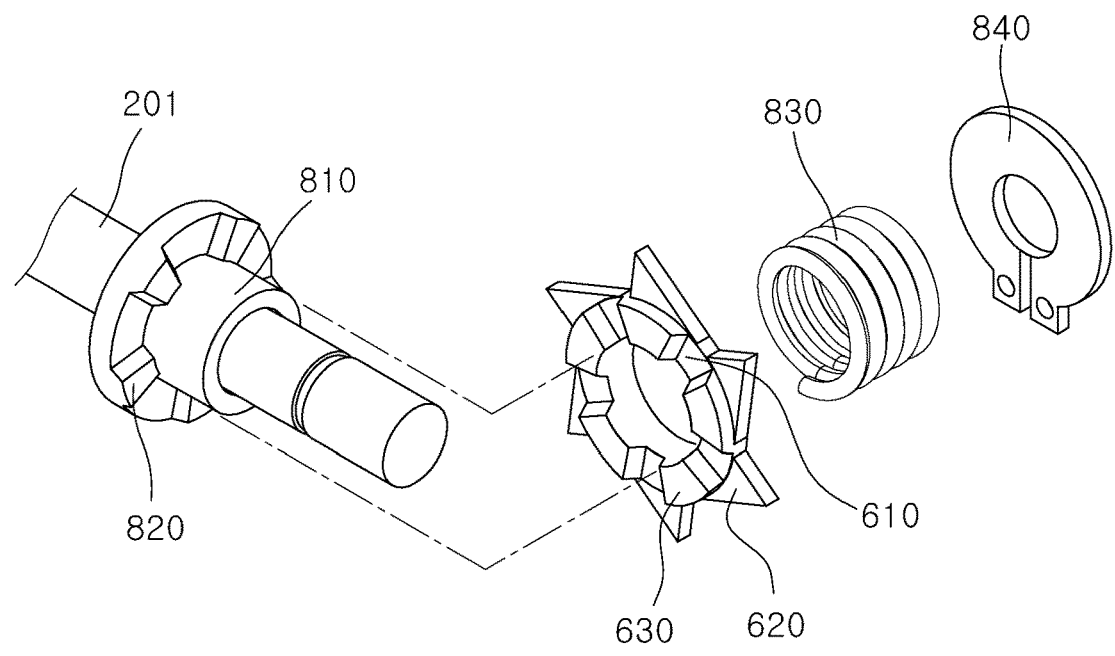

FIG. 21 is a plan view schematically illustrating the configuration of the brake apparatus for the vehicle according to the third embodiment of the present disclosure.

Figure 22:
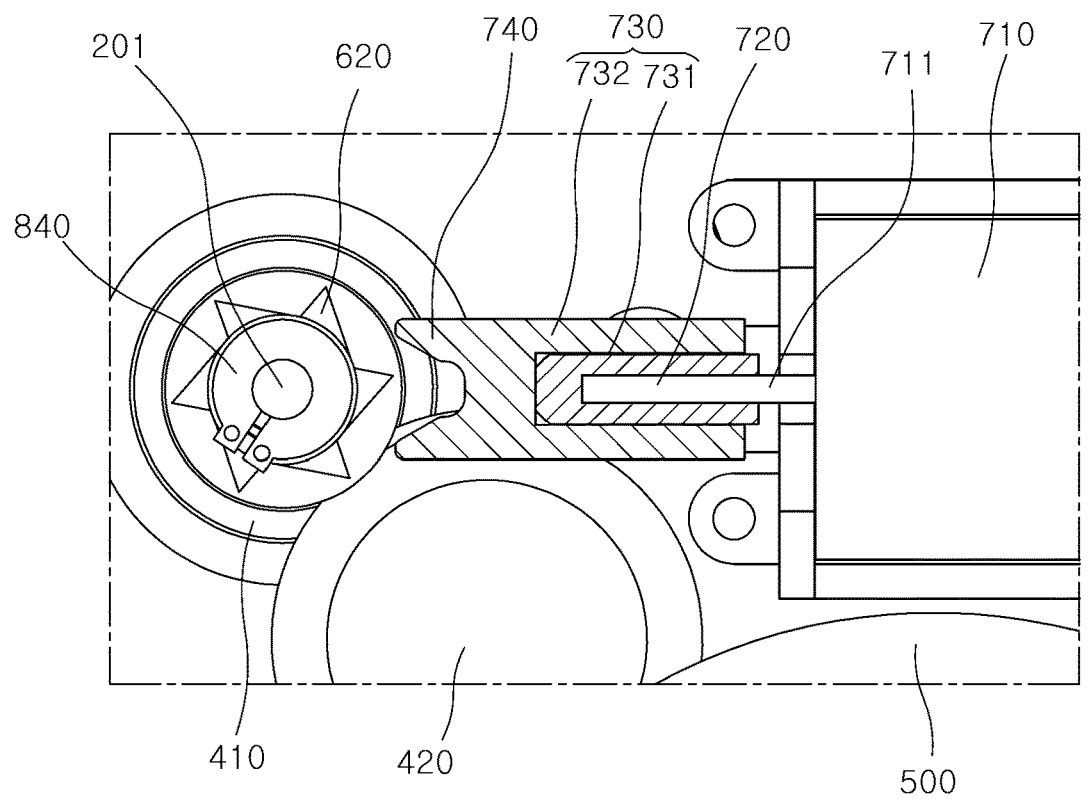

FIG. 22 is a front view schematically illustrating the configuration of the brake apparatus for the vehicle according to the third embodiment of the present disclosure.

Figure 23:
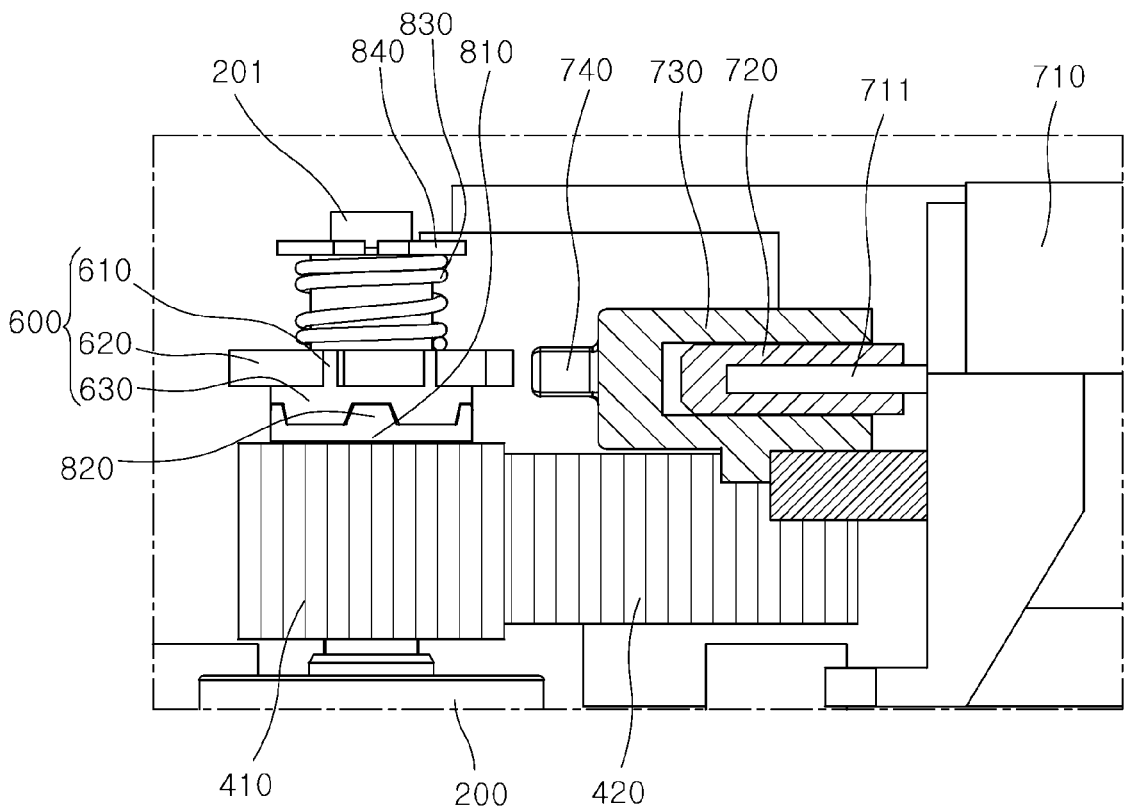

FIG. 23 is an exploded perspective view schematically illustrating configurations of a parking gear unit, a locking unit, and an unlocking unit according to the third embodiment of the present disclosure.

Figure 24:
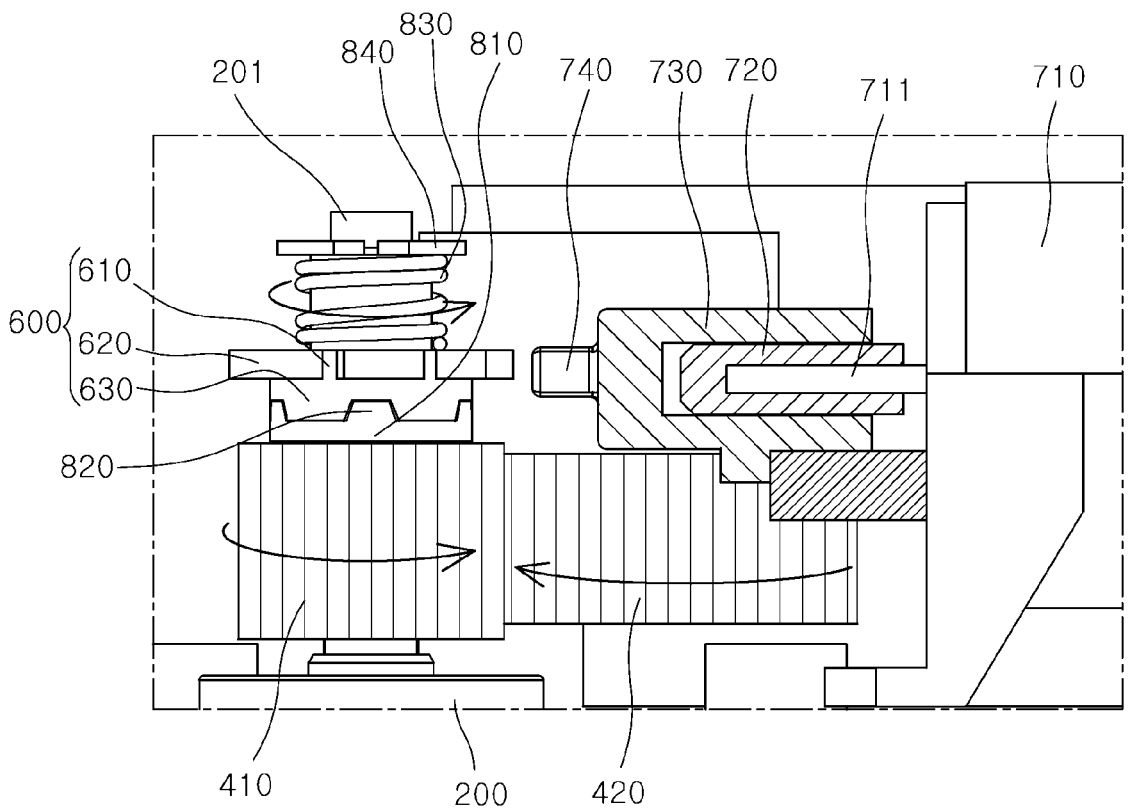
Figure 25:
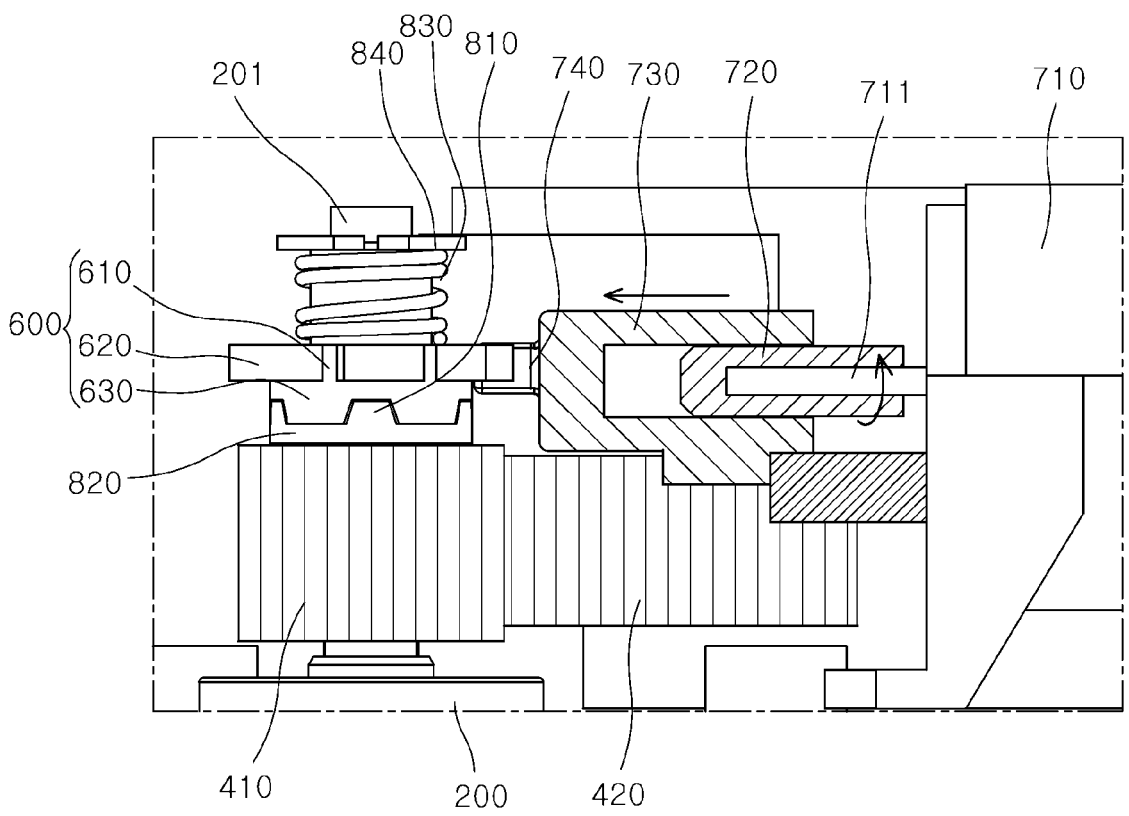
Figure 26:
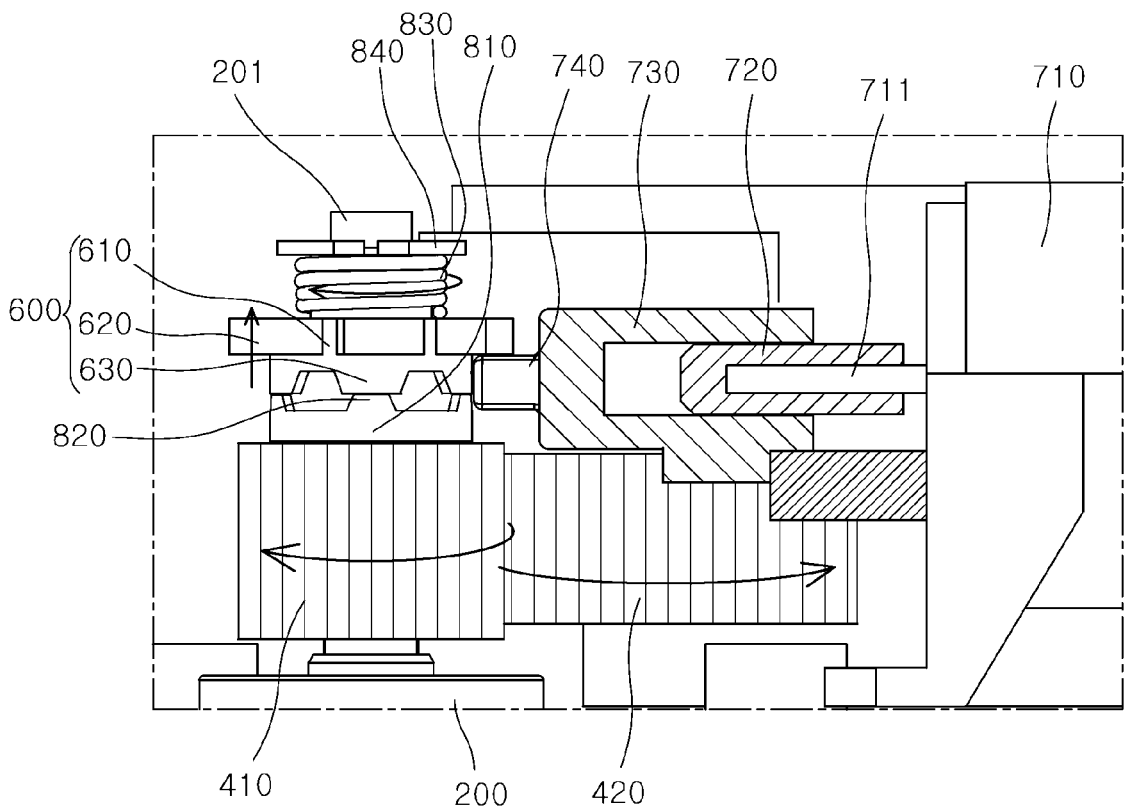

FIGS. 24 to 26 are operational views each schematically illustrating a process of operating the brake apparatus for the vehicle according to the third embodiment of the present disclosure.

DETAILED DESCRIPTION

A brake apparatus for a vehicle according to an embodiment of the present disclosure will be described below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 1:
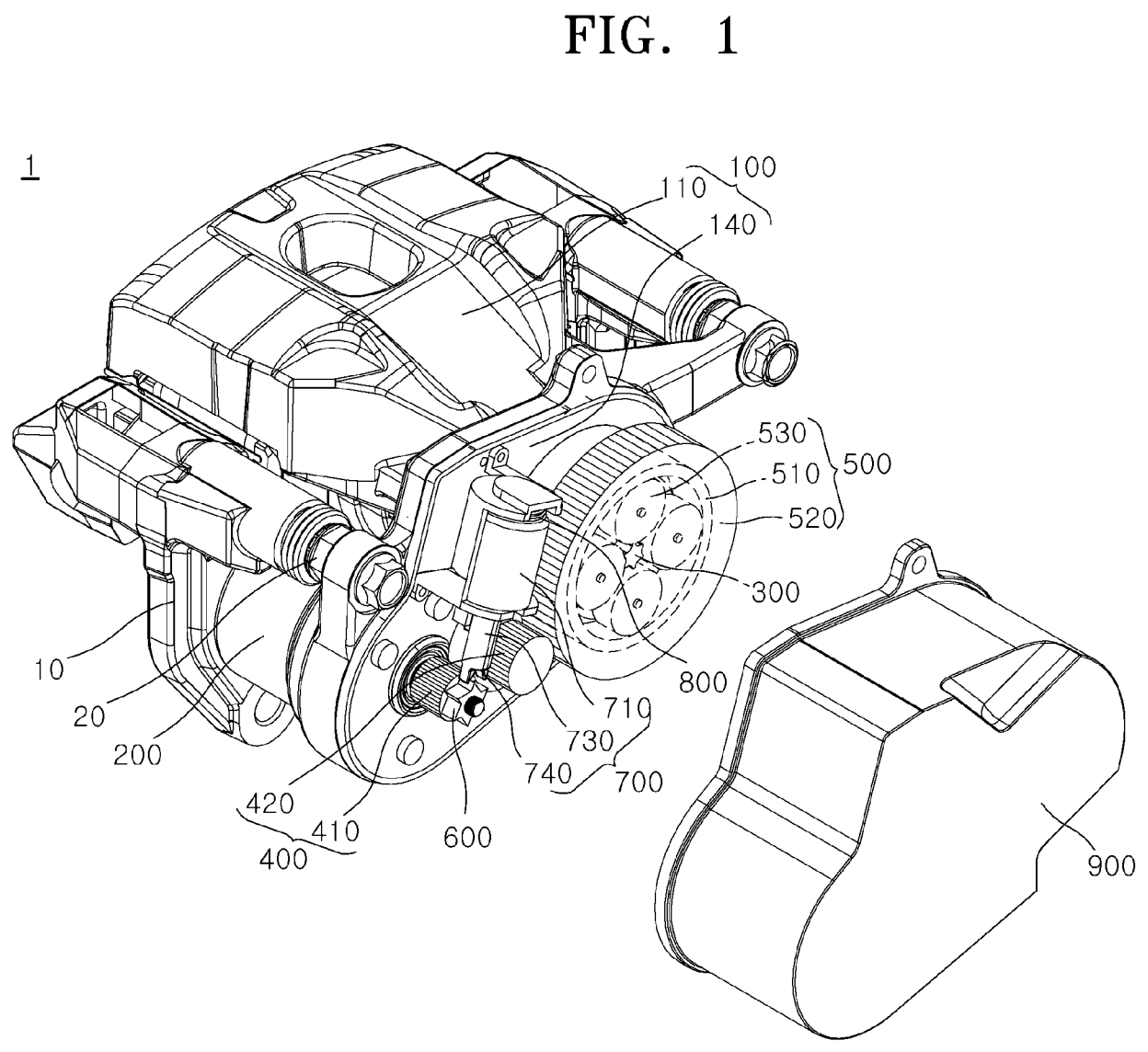
Figure 2:
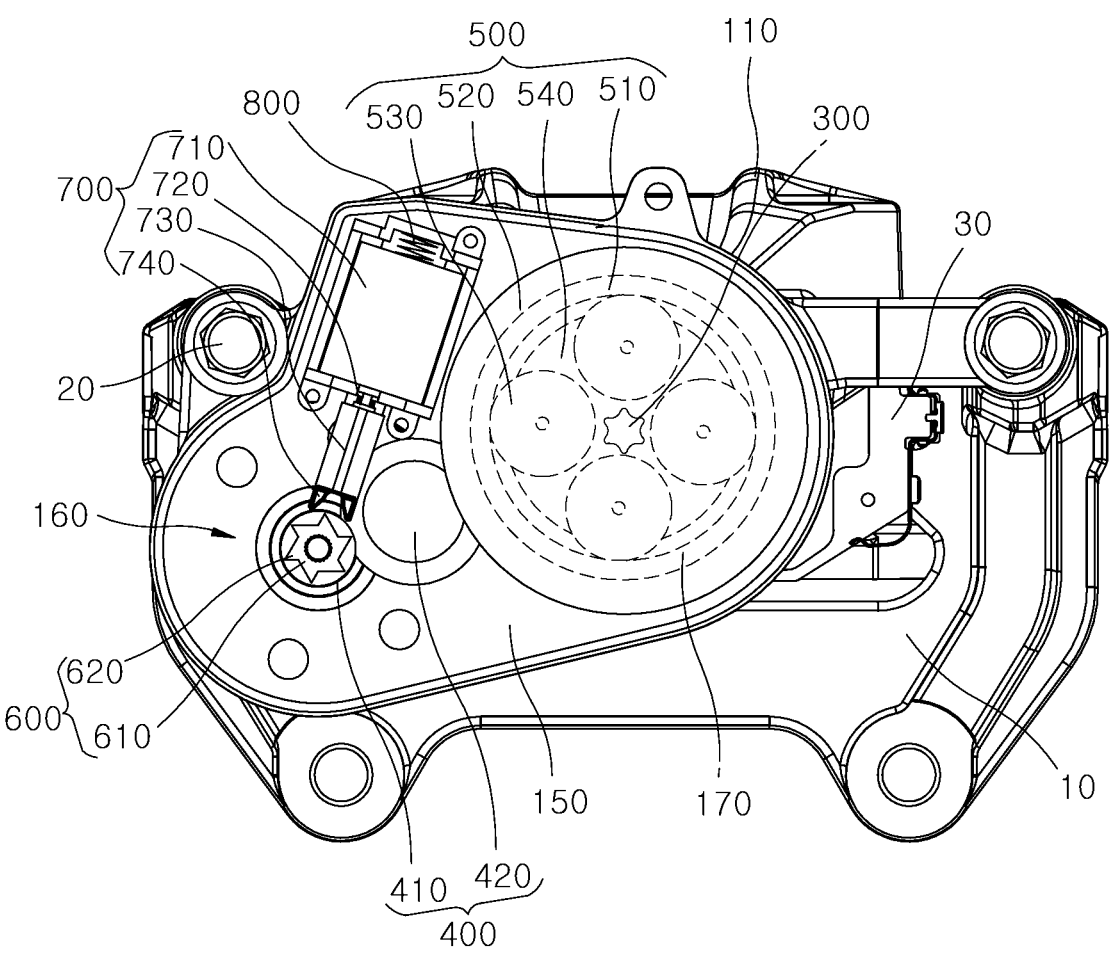
FIG. 2 is a front view schematically illustrating the configuration of the brake apparatus for the vehicle according to the first embodiment of the present disclosure.
Figure 3:
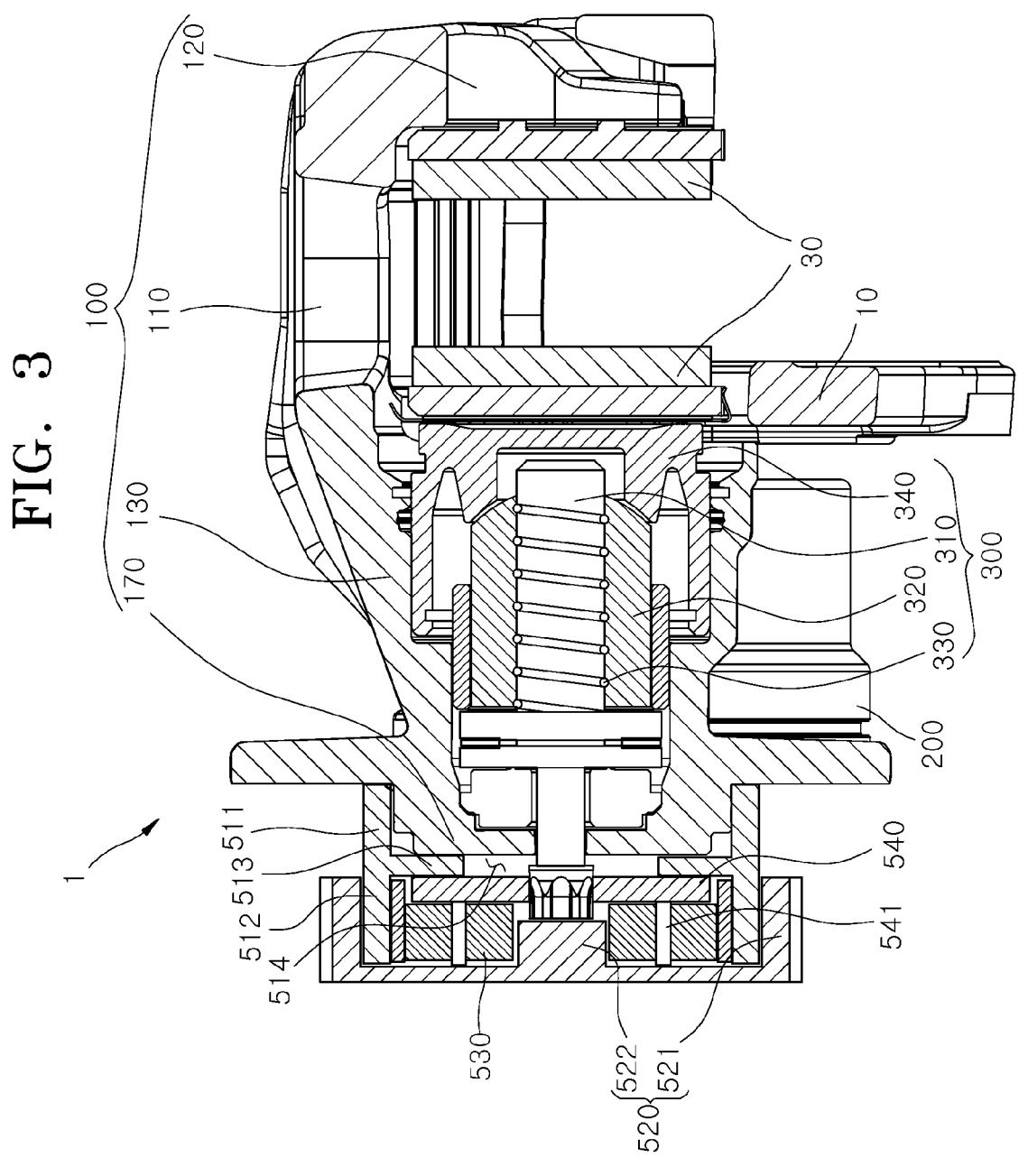
FIG. 3 is a cross-sectional view schematically illustrating the configuration of the brake apparatus for the vehicle according to the first embodiment of the present disclosure.

FIG. 1 is a perspective view schematically illustrating a configuration of a brake apparatus for a vehicle according to a first embodiment of the present disclosure. FIG. 2 is a front view schematically illustrating the configuration of the brake apparatus for the vehicle according to the first embodiment of the present disclosure. FIG. 3 is a cross-sectional view schematically illustrating the configuration of the brake apparatus for the vehicle according to the first embodiment of the present disclosure.

With reference to FIGS. 1 to 3, a brake apparatus for a vehicle 1 according to the first embodiment includes a caliper body 100, a drive unit 200, a piston unit 300, a transfer gear unit 400, a planetary gear unit 500, a parking gear unit 600, a locking unit 700, an unlocking unit 800, and a casing 900.

A caliper body 100 is fixed to a vehicle body with a torque member 10 in between. The caliper body 100 supports all of the drive unit 200, the piston unit 300, the transfer gear unit 400, the planetary gear unit 500, and the locking unit 700 that will be described below. Both sides of the caliper body 100 are combined with the torque member 10 with a guide pin 20 in between, in a manner that is slidably movable. In this case, the caliper body 100 may be supported in a manner that is slidably movable in a direction parallel with an axial direction of a brake disc (not illustrated). With a reaction force that is generated when the piston unit 300 described below presses against a brake pad 30, the caliper body 100 is slidably moved in the direction parallel with the axial direction of the brake disc (not illustrated).

The caliper body 100 according to the first embodiment includes a bridge unit 110, a finger unit 120, a cylinder unit 130, and an assembly unit 140.

The bridge unit 110 forms an upper exterior appearance of the caliper body 100. The bridge unit 110 according to the first embodiment may be formed in the shape of a plate in such a manner that an inner surface thereof faces an outer circumferential surface in a state of being spaced a predetermined distance apart therefrom. The bridge unit 110 is specifically design-changeable in shape and area in such a manner that varies with a size of the brake disc or the like.

The finger unit 120 extends from one side of the bridge unit 110 and thus forms a front exterior appearance of the caliper body 100. The finger unit 120 according to the first embodiment extends vertically downward from a front-end portion of the bridge unit 110. The finger unit 120 is arranged in such a manner that an inner surface thereof faces one of the brake pads 30 in a pair that is arranged outward from the brake disc when viewed from the width direction of a vehicle. In conjunction with a sliding movement of the caliper body 100, the finger unit 120 presses against the brake pad 30 or no longer presses against the brake pad 30.

The cylinder unit 130 extends from the other side of the bridge unit 110 and thus forms a rear exterior appearance of the caliper body 100. The cylinder unit 130 movably supports the piston unit 300 described below. The cylinder unit 130 according to the first embodiment extends vertically downward from a rear end portion of the bridge unit 110. The cylinder unit 130 is formed in such a manner as to have the shape of a hollow cylinder that is open at one side thereof. The cylinder unit 130 is arranged in such a manner that the open side thereof faces one of the brake pads 30 in a pair that is arranged inward from the brake disc when viewed from the width direction of the vehicle.

The assembly unit 140 extends from the cylinder unit 130 and supports the drive unit 200, the transfer gear unit 400, and the planetary gear unit 500 that will be described below. That is, the assembly unit 140 serves as a constituent element for mechanically connecting the drive unit 200, the transfer gear unit 400, and the planetary gear unit 500 to the caliper body 100. With the assembly unit 140, the drive unit 200, the transfer gear unit 400, and the planetary gear unit 500 may be directly fixed to the caliper body 100 without the need for a separate structure, such as an actuator housing in the related art. Thus, the number of components can be reduced. Moreover, the center of gravity of all of the drive unit 200, the transfer gear unit 400, and the planetary gear unit 500 may be positioned close to a center region of caliper body 100. Thus, a lopsided load can be prevented, and the generation of vibration can be reduced.

Figure 4:
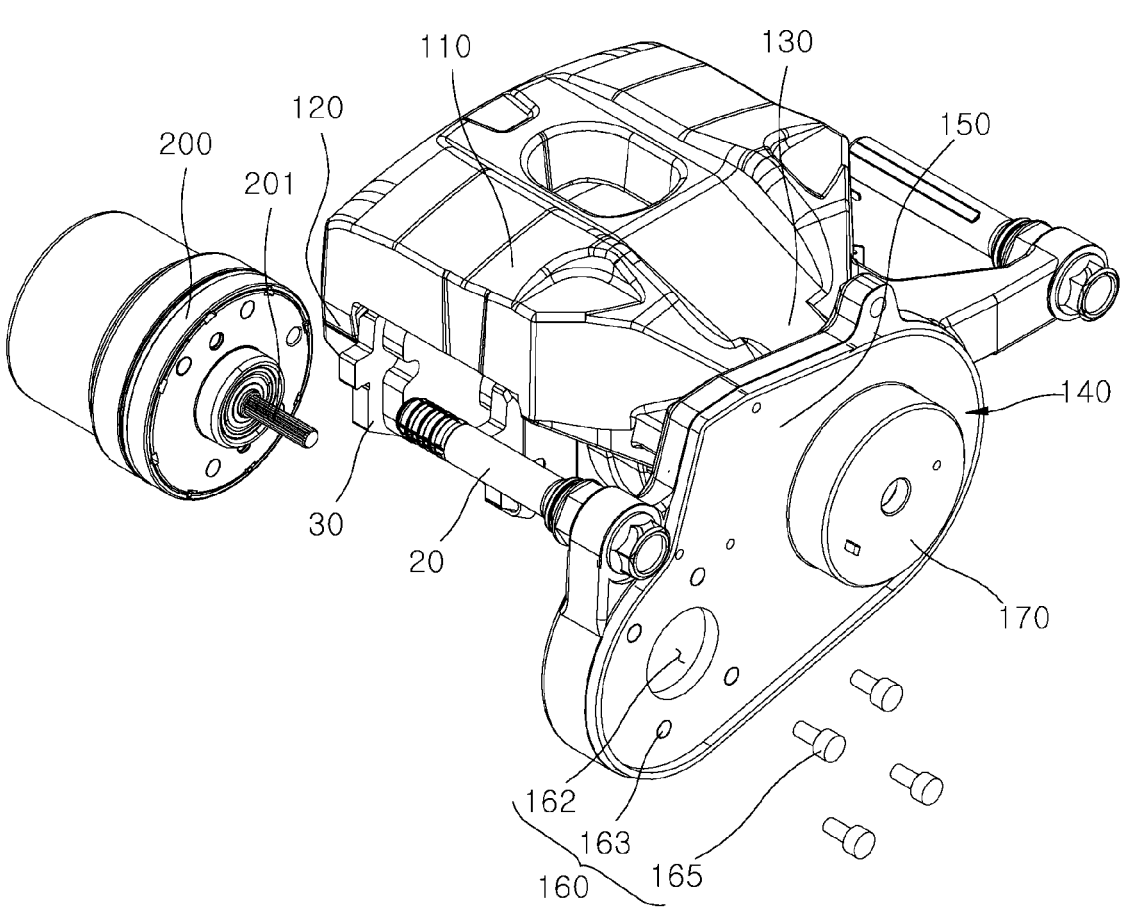
FIG. 4 is an exploded perspective view schematically illustrating a configuration of an assembly unit according to the first embodiment of the present disclosure.
Figure 5:
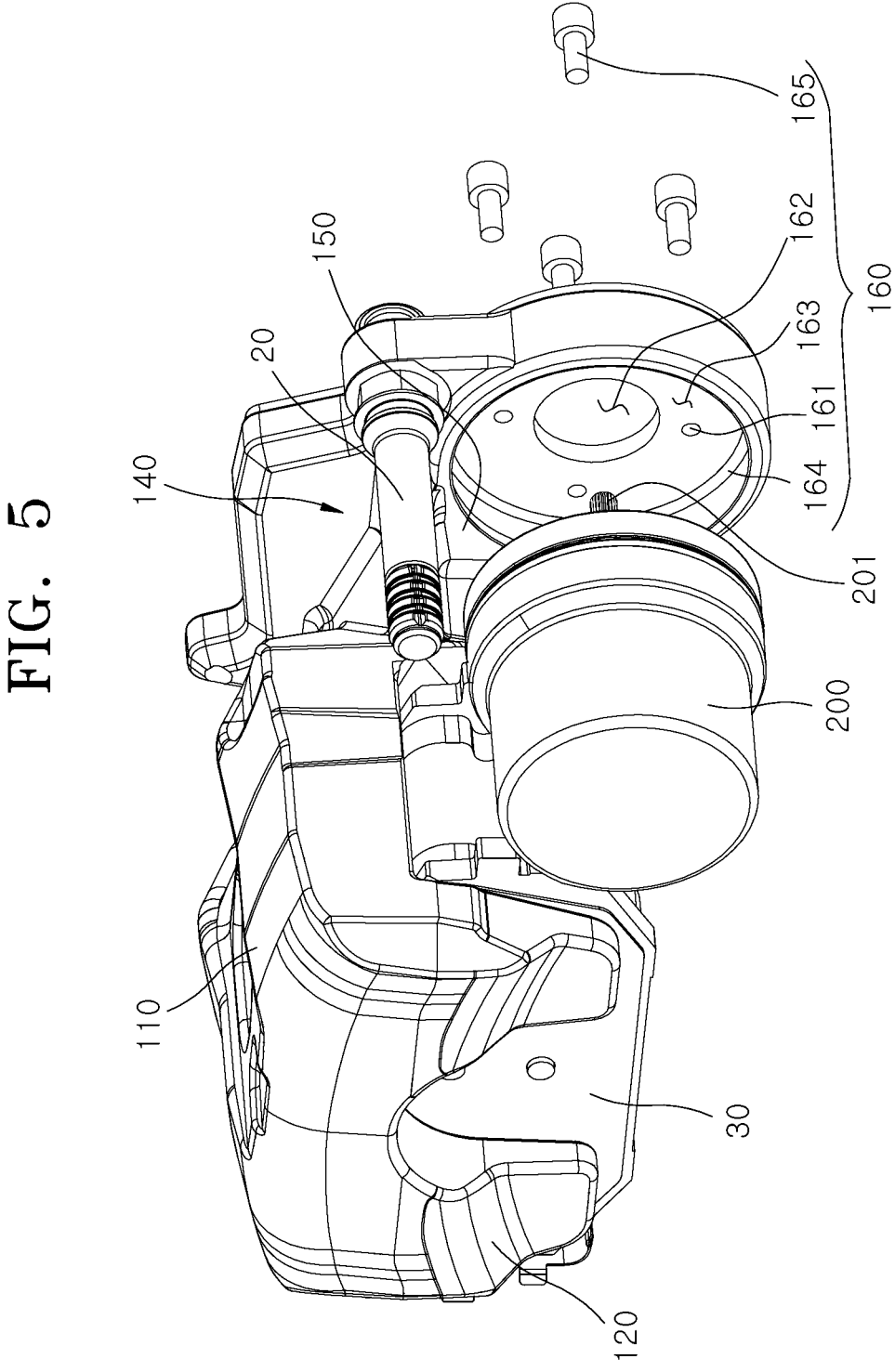
FIG. 5 is an exploded perspective view illustrating the configuration of the assembly unit according to the first embodiment of the present disclosure, when viewed from a different angle than in FIG. 4.

FIG. 4 is an exploded perspective view schematically illustrating a configuration of the assembly unit 140 according to the first embodiment of the present disclosure. FIG. 5 is an exploded perspective view illustrating the configuration of the assembly unit 140 according to the first embodiment of the present disclosure, when viewed from a different angle than in FIG. 4.

With reference to FIGS. 4 and 5, the assembly unit 140 according to the first embodiment includes an assembly body 150, a first assembly unit 160, and a second assembly unit 170.

The assembly body 150 forms a schematic exterior appearance of the assembly unit 140. The assembly body 150 according to the first embodiment may be formed in the shape of a plate in such a manner as to extend, toward one side (the left side in FIG. 4) in a radial direction of the cylinder unit 130, from a surface of the other side of the cylinder unit 130, that is, from the opposite surface of the cylinder unit 130 that is opposite to a surface of the cylinder unit 130 that is arranged in a manner that faces the brake pad 30. The assembly body 150 may be integrally formed with the cylinder unit 130 by casting molding when manufacturing the caliper body 100. A cross section of the assembly body 150 is not limited to a shape illustrated in FIGS. 4 and 5. The assembly body 150 is specifically design-changeable in a shape of a cross section in a manner that varies with a state where the drive unit 200, the transfer gear unit 400, and the planetary gear unit 500 are arranged.

The first assembly unit 160 is provided on one side of the assembly body 150 and supports the drive unit 200.

The first assembly unit 160 according to the first embodiment includes a seating groove 161, an insertion hole 162, a fastening hole 163, and a sealing member 164.

The seating groove 161 is formed in the shape of a groove by concavely recessing an inner surface of the assembly body 150, facing the cylinder unit 130, toward the inside of the assembly body 150. The seating groove 161 is arranged to the left of the assembly body 150 as illustrated in FIG. 4. The seating groove 161 is formed in such a manner as to have an approximately circular cross section and is arranged in such a manner that the central axis thereof is in parallel with the central axis of the cylinder unit 130. The drive unit 200 described below is inserted into the seating groove 161, and a front-end portion of the drive unit 200 is seated on a bottom surface of the drive unit 200. The seating groove 161 is design-changeable in diameter and dept in a manner that varies with the size or the like of the drive unit 200 described below.

The insertion hole 162 is drilled in the seating groove 161. The insertion hole 162 and the seating groove 161 are arranged in such a manner that the central axes thereof are coaxially arranged. The insertion hole 162 may be formed in such a manner as to have a circular or a circle-like cross section. A first output shaft 201 that extends from the front-end portion of the drive unit 200 described below is inserted into the insertion hole 162. The insertion hole 162 is design-changeable in diameter in a manner that varies with a diameter or the like of the first output shaft 201.

The fastening hole 163 is arranged in a manner that is spaced away from the insertion hole 162 and is drilled in the assembly body 150. The fastening hole 163, as illustrated in FIGS. 4 and 5, may be directly drilled in the seating groove 161. A plurality of fastening holes 163 may be formed. The plurality of fastening holes 163 are arranged in such a manner that they are spaced a predetermined distance away from the insertion hole 162 in a radial direction of the insertion hole 162 and are spaced apart along a circumferential direction of the insertion hole 162.

A fastening member 165 is inserted into the fastening hole 163. The fastening member 165 is fastened to the drive unit 200 and keeps the drive unit 200 seated in the seating groove 161. The fastening member 165 according to the first embodiment may be formed in such a manner as to have the shape of a bolt having a threaded outer circumferential surface. A plurality of fastening members 165 are provided and are inserted into the plurality of fastening holes 163, respectively. The fastening hole 163 is design-changeable in diameter in a manner that varies with a diameter or the like of the fastening member 165.

The sealing member 164 is provided between the seating groove 161 and the drive unit 200 and prevents a foreign material from being introduced into the drive unit 200. The sealing member 164 according to the first embodiment is formed in such a manner as to have the shape of approximately a ring and is arranged along an inner circumferential surface of the seating groove 161. The sealing member 164 may be formed of an elastic material, such as rubber or silicone. The scaling member 164 is brought into close contact with a circumferential surface of the front-end portion of the drive unit 200 that is inserted into the seating groove 161. Accordingly, a gap between the drive unit 200 and the seating groove 161 may be sealed up, and thus a foreign material, such as moisture or dust, may be blocked from being introduced into the drive unit 200. Moreover, clastic deformation of the sealing member 164 may cancel out vibration that is generated from the drive unit 200.

The second assembly unit 170 is provided on the other side of the assembly body 150 and supports the planetary gear unit 500. The second assembly unit 170 according to the first embodiment may be formed in the shape of a cylinder in such a manner as to protrude from an outer surface of the assembly body 150 in a direction parallel with an axial direction of the piston unit 300 described below. The second assembly unit 170 and the piston unit 300 are arranged in such a manner that the central axes thereof are coaxially positioned. A structure for combining the second assembly unit 170 and the planetary gear unit 500 described below with each other will be described below.

The drive unit 200 is fixed to the caliper body 100 and, by being supplied with electric power, generates a rotational force in a first rotational direction (i.e., forward direction) or a second rotational direction (i.e., reverse direction) opposite to the first rotational direction. The drive unit 200 according to the first embodiment may be exemplified by a cylindrical electric motor that is electrically connected to a battery of the battery, is supplied with electric power, and thus generates a rotational force through an electromagnetic interaction between a stator and a rotor. The first output shaft 201 is protrusively formed on the front-end portion of the drive unit 200. The first output shaft 201 is rotated about the central axis thereof with the rotational force that is generated from the drive unit 200. In this case, the rotational force that is generated in the forward direction from the drive unit 200 is a rotational force that causes the piston unit 300 to apply a braking force and, for example, may mean a rotational force that rotates the first output shaft 201 counterclockwise as illustrated in FIG. 3. In addition, the rotational force that is generated in the reverse direction from the drive unit 200 is a rotational force that causes the piston unit 300 described below to cancel the braking force and, for example, may mean a rotational force that rotates the first output shaft 201 clockwise as illustrated in FIG. 3.

The front-end portion of the drive unit 200 is inserted into the seating groove 161 in a state where the first output shaft 201 is arranged in such a manner as to face the seating groove 161. The first output shaft 201 protruding from the front-end portion of the drive unit 200 is inserted into the insertion hole 162 by passing therethrough, and an end portion of the first output shaft 201 protrudes out of the assembly body 150. An edge of the front-end portion of the drive unit 200 inserted into the seating groove 161 is supported on the sealing member 164 in a state of being brought into close contact therewith. The fastening member 165 is inserted into the fastening hole 163 and the front-end portion of the drive unit 200 by sequentially passing therethrough. The threaded outer circumferential surface of the fastening member 165 is combined, by bolting, with the front-end portion of the drive unit 200.

The piston unit 300 is installed on the caliper body 100, more specifically, on the cylinder unit 130 in a manner that is movable backward and forward. The piston unit 300 operates in conjunction with the rotational force that is generated from the drive unit 200 and reciprocates (i.e., moves forward and backward) inside the cylinder unit 130. The piston unit 300 applies or cancels the braking force according to whether the piston unit 300 is moved forward or backward. More specifically, when the rotational force is generated in the forward direction from the drive unit 200, the piston unit 300 is moved forward, presses against the brake pad 30 toward the brake disc, and thus applies the braking force to the vehicle. In addition, when the rotation force is generated in the reverse direction from the drive unit 200, the piston unit 300 is moved backward and thus no longer presses against the brake pad, thereby canceling the braking force applied to the vehicle.

The piston unit 300 according to the first embodiment includes a ball screw 310, a ball nut 320, a ball 330, and a piston 340.

The ball screw 310 is supplied with the rotational force that is generated from the drive unit 200, through the planetary gear unit 500, thereby being rotated. The ball screw 310 according to the first embodiment is formed in such a manner as to have the shape of approximately a bar and is installed rotatably inside the cylinder unit 130. The ball screw 310 is arranged in such a manner that a longitudinal direction thereof is in parallel with a longitudinal direction of the cylinder unit 130. A groove is formed in an outer circumferential surface of the ball screw 310. A circumference of one side of the ball 330 described below is seated in the groove. The groove extends spirally along the longitudinal direction of the ball screw 310 and provides a circular path for the ball 330. A rear end portion of the ball screw 310 passes through the central axis of the second assembly unit 170 and protrudes out of the second assembly unit 170. The rear end portion of the ball screw 310 is connected to a carrier 540 of the planetary gear unit 500 described below. More specifically, spline teeth may be formed on an outer circumferential surface of the rear end portion of the ball screw 310 and may be combined with an inner circumferential surface of the carrier 540 by being engaged therewith. Accordingly, when the carrier 540 is rotated, the ball screw 310 may be axially rotated about the central axis thereof, along with the carrier 540.

The ball nut 320 operates in conjunction with the rotation of the ball screw 310, and reciprocates in a straight line along the longitudinal direction of the ball screw 310. The ball nut 320 according to the first embodiment may be formed in the shape of a hollow cylinder in such a manner as to be installed to surround the outer circumferential surface of the ball screw 310. The ball nut 320 is arranged in such a manner that an inner circumferential surface thereof faces the outer circumferential surface of the ball screw 310 in a state of being spaced a predetermined distance apart therefrom. A groove may be formed in an inner circumferential surface of the ball nut 320. A circumference of the other side of the ball 330 described below is seated in the groove. The groove extends spirally along a longitudinal direction of the ball nut 320 and provides the circular path for the ball 330. When the ball screw 310 is rotated, with a circular movement of the ball 330, the ball nut 320 reciprocates in a straight line in the forward-reverse direction along the longitudinal direction of the ball screw 310.

The ball 330 is provided between the ball screw 310 and the ball nut 320, and both sided thereof are brought into rolling contact with the ball screw 310 and the ball nut 320, respectively. The ball 330 according to the first embodiment is formed in such a manner as to have the shape of approximately a sphere and is installed between the ball screw 310 and the ball nut 320. Circumferences of both sides of the ball 330 are brought into rolling contact with the outer circumferential surface of the ball screw 310 and the inner circumferential surface of the ball nut 320, respectively. When the ball screw 310 is rotated, the ball 330 is circularly moved along the groove, and converts rotational motion of the ball screw 310 into linear reciprocating motion of the ball nut 320.

The piston 340 reciprocates in a straight line, along with the ball nut 320 and, according to a movement direction thereof, presses against the brake pad 30 or no longer presses against the brake pad 30. The piston 340 according to the first embodiment is installed in such a manner that is slidably movable along the longitudinal direction of the cylinder unit 130 inside the cylinder unit 130. A rear end portion of the piston 340 may be integrally combined with a front-end portion of the ball nut 320 and may reciprocate in a straight line along the longitudinal direction of the cylinder unit 130, along with the ball nut 320. As the ball nut 320 is moved forward, a front-end portion of the piston 340 is brought into contact with the brake pad 30 and presses against the brake pad 30 toward the brake disc, thereby generating the braking force. As the ball nut 320 is moved backward, the piston 340 is separated from the brake pad 30 and no longer presses again the brake pad 30, thereby canceling the braking force.

The transfer gear unit 400 is supplied with the rotational force from the drive unit 200 and thus is rotated. Moreover, the transfer gear unit 400 transfers the rotational force that is generated from the drive unit 200, to the piston unit 300 with the planetary gear unit 500 in between.

The transfer gear unit 400 according to the first embodiment includes a first transfer gear 410 and a second transfer gear 420.

The first transfer gear 410 is connected to the first output shaft 201 of the drive unit 200 and is rotated along with the first output shaft 201 of the drive unit 200. The first transfer gear 410 according to the first embodiment may be formed in the shape of a hollow helical gear, a spur gear, or the like that in such a manner that teeth are formed on an outer circumferential surface thereof. The first transfer gear 410 and the first output shaft 201 of the drive unit 200 are arranged in such a manner that the central axes thereof are coaxially positioned. The first output shaft 201 is inserted into a central portion of the first transfer gear 410 by passing therethrough. When the drive unit 200 operates, the first transfer gear 410 is rotated at the same angle speed as the first output shaft 201 of the drive unit 200.

The second transfer gear 420 is combined with the first transfer gear 410 by being engaged therewith and operates in conjunction with the rotation of the first transfer gear 410. The second transfer gear 420 according to the first embodiment may be formed in the shape of a hollow helical gear, a spur gear, or the like that in such a manner that teeth are formed on an outer circumferential surface thereof. The second transfer gear 420 is combined with the first transfer gear 410 and a sun gear 520 of the planetary gear unit 500 described below by being engaged with the first transfer gear 410 and the sun gear 520 therebetween. The second transfer gear 420 is arranged in such a manner that the central axis thereof is in parallel with the central axis of the first transfer gear 410. The second transfer gear 420 is rotatably supported on the assembly body 150 with a separate rotational shaft (not illustrated) in between. The second transfer gear 420 is formed in such a manner as to have a greater diameter than the first transfer gear 410. Accordingly, the second transfer gear 420 may increase a magnitude of the rotational force transferred from the first transfer gear 410 to the planetary gear unit 500.

The planetary gear unit 500 is fixed to the caliper body 100 and moves the piston unit 300 forward and backward in conjunction with the rotation of the transfer gear unit 400.

Figure 6:
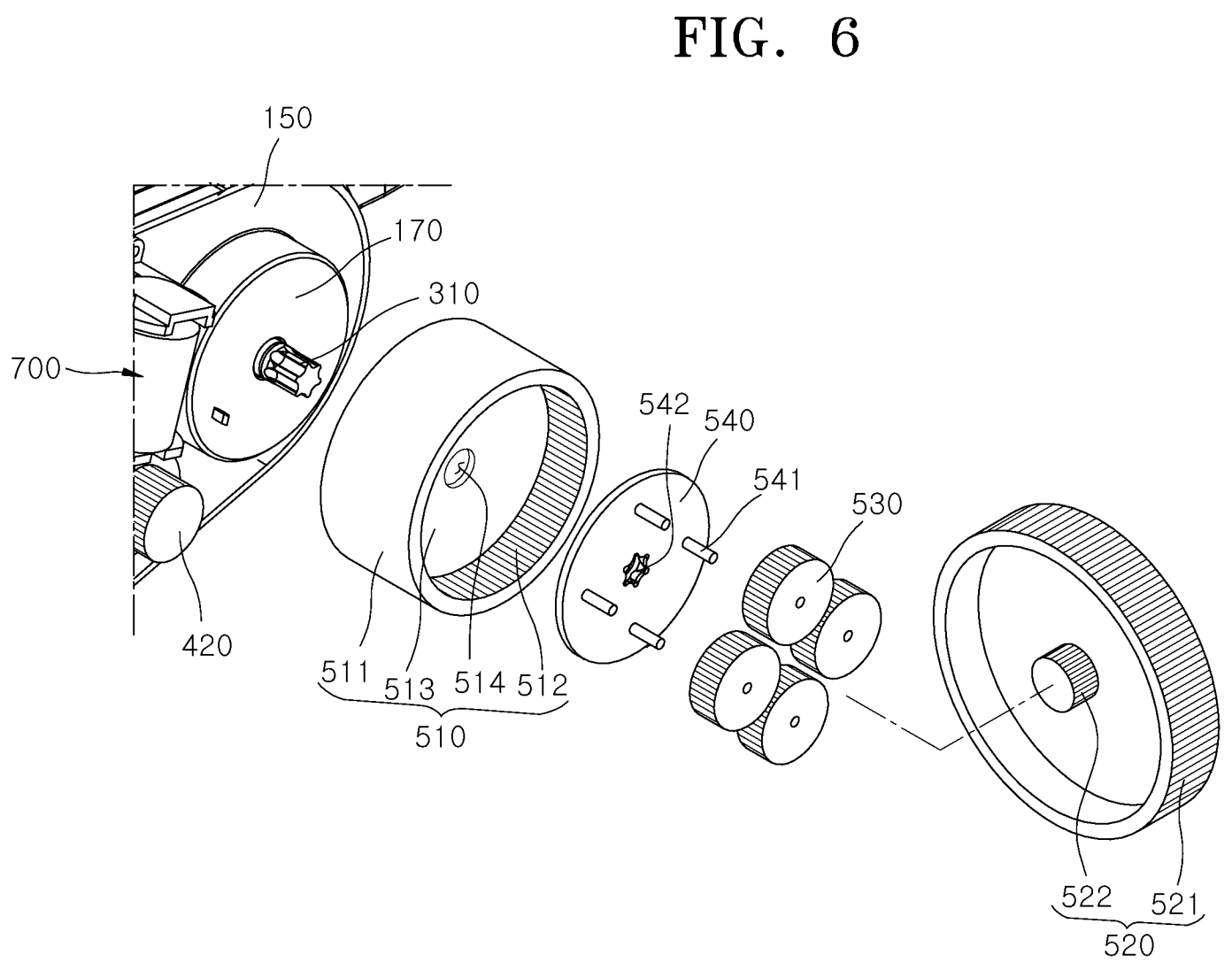
Figure 7:
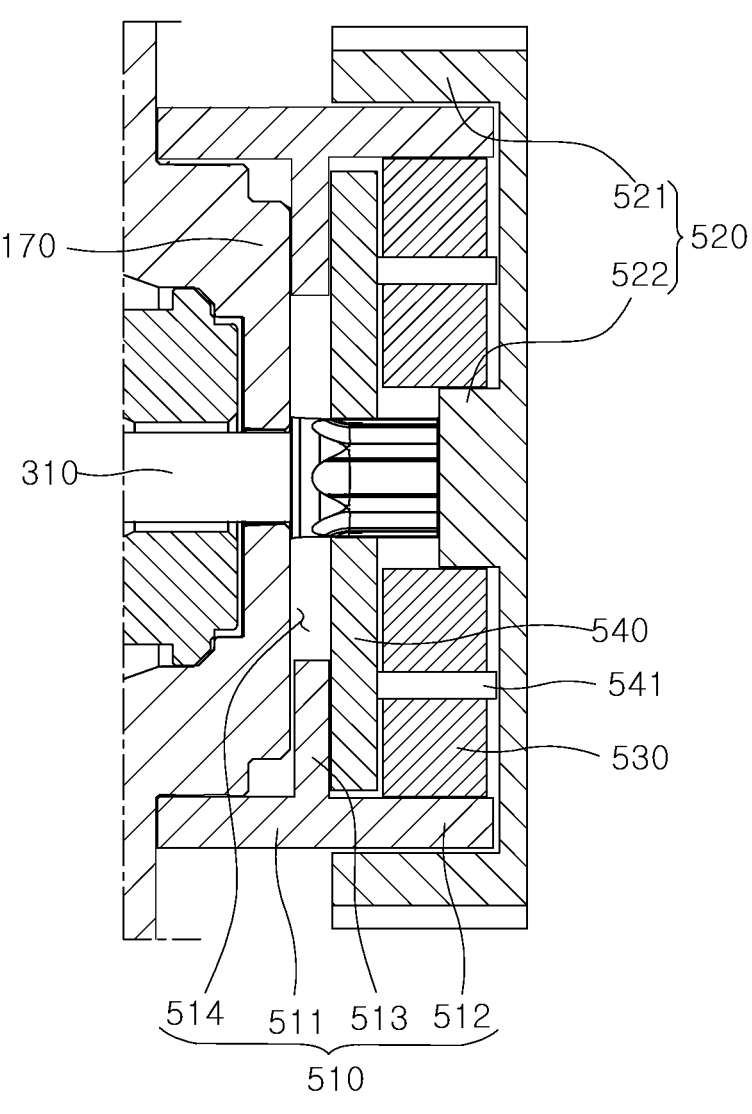
FIG. 7 is an enlarged cross-sectional view schematically illustrating the configuration of the planetary gear unit according to the first embodiment of the present disclosure.

FIG. 6 is an exploded perspective view schematically illustrating a configuration of the planetary gear unit 500 according to the first embodiment of the present disclosure. FIG. 7 is an enlarged cross-sectional view schematically illustrating the configuration of the planetary gear unit 500 according to the first embodiment of the present disclosure.

With reference to FIGS. 6 and 7, the planetary gear unit 500 according to the first embodiment includes a ring gear 510, the sun gear 520, a planetary gear 530, and the carrier 540.

The ring gear 510 is fixed to the second assembly unit 170 and supports all of the sun gear 520, the planetary gear 530, and the carrier 540 that will be described below. Accordingly, the ring gear 510 may directly support the sun gear 520, the planetary gear 530, and the carrier 540 with respect to the caliper body 100 without the need for an actuator housing in the related art. Thus, reductions in weight and cost are possible. In addition, the ring gear 510 is fixed to the second assembly unit 170 and thus increases an overall reduction gear ratio of the planetary gear unit 500. Thus, a length or a size of the transfer gear unit 400 that is necessary to increase the magnitude of the rotational force that is generated from the drive unit 200 can be decreased, and a reduction in a full length of the assembly unit 140 is possible.

The ring gear 510 according to the first embodiment includes a stationary unit 511, a deceleration unit 512, and a support unit 513.

The stationary unit 511 forms an exterior appearance of one side of the ring gear 510 and is fixed to the second assembly unit 170. The stationary unit 511 according to the first embodiment may be formed in such a manner as to have the shape of a hollow cylinder that is open at both sides thereof. An inner circumferential surface of the stationary unit 511 is pressed into an outer circumferential surface of the second assembly unit 170, in a state where the second assembly unit 170 is inserted into the stationary unit 511. Thus, the stationary unit 511 may be fixed to the second assembly unit 170.

The deceleration unit 512 forms an exterior appearance of the other side of the ring gear 510 and is combined with the planetary gear 530 by being engaged therewith. The deceleration unit 512 according to the first embodiment may be formed in such a manner as to have the shape of a hollow cylinder that is open at both sides thereof. Gear teeth are formed on an inner circumferential surface of the deceleration unit 512 in such a manner that the inner circumferential surface thereof is combined with an outer circumferential surface of the planetary gear 530 by being engaged therewith. The deceleration unit 512 and the stationary unit 511 are arranged in such a manner that the central axes thereof are coaxially positioned. In this case, the stationary unit 511 and the deceleration unit 512 may be formed in such a manner that respective end portions thereof that face each other are integrally connected to each other and thus forms the shape of a cylinder that continuously extends along an axial direction of the ball screw 310.

The support unit 513 is provided between the stationary unit 511 and the deceleration unit 512 and supports the carrier 540 described below. The support unit 513 according to the first embodiment may be formed in the shape of a circular plate in such a manner as to extend from a border line between the stationary unit 511 and the deceleration unit 512 toward the inside in a radial direction of the ring gear 510. A through-hole 514 is formed in a central portion of the support unit 513 in such a manner that the rear end portion of the ball screw 310 protruding out of the second assembly unit 170 passes through the through-hole 514.

The sun gear 520 is rotatably supported on the ring gear 510 and is combined with the transfer gear unit 400 by being engaged therewith.

The sun gear 520 according to the first embodiment includes a first sun gear 521 and a second sun gear 522.

The first sun gear 521 is combined with the second transfer gear 420 by being engaged therewith and is rotated in conjunction with the rotation of the second transfer gear 420. The first sun gear 521 according to the first embodiment is formed in such a manner as to have the shape of a cylinder that is open at one side thereof. The first sun gear 521 is arranged in such a manner that the open side thereof faces the ring gear 510. The ring gear 510, more particularly, the deceleration unit 512 is inserted into the first sun gear 521, and an inner circumferential surface of the first sun gear 521 is rotatably brought into contact with an outer circumferential surface of the deceleration unit 512. Gear teeth are protrusively formed on an outer circumferential surface of the first sun gear 521, and the outer circumferential surface thereof is combined with an outer circumferential surface of the second transfer gear 420 by being engaged therewith.

The second sun gear 522 extends from the first sun gear 521 and is combined with the planetary gear 530 described below by being engaged therewith. The second sun gear 522 according to the first embodiment may be formed in the shape of a cylinder in such a manner as to extend from a central portion of the first sun gear 521 toward the open side of the first sun gear 521. The second sun gear 522 is formed in such a manner as to have a smaller diameter than the first sun gear 521. The second sun gear 522 and the first sun gear 521 are arranged in such a manner that the central axes thereof are coaxially positioned. Gear teeth are protrusively formed on an outer circumferential surface of the second sun gear 522, and the outer circumferential surface thereof is combined with the outer circumferential surface of the planetary gear 530 by being engaged therewith.

The planetary gear 530 is combined with the ring gear 510 and the sun gear 520 by being engaged therewith and is rotated about the central axis thereof and revolved in conjunction with the rotation of the sun gear 520. The planetary gear 530 according to the first embodiment may be formed in the shape of a cylinder in such a manner as to have an outer circumferential surface on which gear teeth are formed. The planetary gear 530 is rotatably installed inside the deceleration unit 512. The planetary gear 530 is arranged in such a manner that the central axis thereof is spaced a predetermined distance in a radial direction of the deceleration unit 512 away from the central axis of the deceleration unit 512 and is in parallel with the central axis of the deceleration unit 512. A circumference of one side of the planetary gear 530 is combined with the inner circumferential surface of the deceleration unit 512 by being engaged therewith, and a circumference of the other side thereof is combined with the outer circumferential surface of the second sun gear 522 by being engaged therewith. The planetary gear 530 is supplied with the rotational force from the second sun gear 522. Thus, the planetary gear 530 is rotated about the central axis thereof and, at the same time, is revolved around the central axis of the deceleration unit 512. A plurality of planetary gears 530 may be formed. The plurality of planetary gears 530 are arranged in such a manner as to be spaced a predetermined distance apart along a circumferential direction of the deceleration unit 512. FIG. 6 illustrates an example where four planetary gears 530 are arranged. However, the number of planetary gears 530 is not limited to four. The planetary gear 530 is design-changeable in such a manner as not to be limited in number.

The carrier 540 is connected to the planetary gear 530 and thus transfers a rotational force of the planetary gear 530 to the piston unit 300. The carrier 540 according to the first embodiment is formed in such a manner as to have the shape of approximately a circular plate and is arranged between the support unit 513 and the planetary gear 530.

A connection shaft 541 that is to be connected to the planetary gear 530 is formed on the carrier 540. The connection shaft 541 according to the first embodiment may be formed in the shape of a bar in such a manner as to extend one surface of the carrier 540 facing the planetary gear 530. The connection shaft 541 is formed in such a manner that the central axis thereof is in parallel with the central axis of the carrier 540. The connection shaft 541 is inserted into the central axis of the planetary gear 530 in such a manner as to pass therethrough and thus supports the planetary gear 530 in a manner that is rotatable about the central axis thereof. A plurality of connection shafts 541 are provided and support the plurality of planetary gears 530, respectively.

The connection shaft 541 transfers a rotational force, resulting from revolving the planetary gear 530, to the carrier 540. Accordingly, the carrier 540 may be rotated about the central axis thereof when the planetary gear 530 is revolved.

A coupling unit 542 that is to be connected to the ball screw 310 is formed on the carrier 540. The coupling unit 542 according to the first embodiment may be formed in the shape of a hole by drilling a hole in the central axis of the carrier 540. The coupling unit 542 is formed in such a manner as to have a cross section corresponding to the rear end portion of the ball screw 310 on which spline teeth are formed. The coupling unit 542 is combined with the outer circumferential surface of the rear end portion of the ball screw 310 by being engaged therewith in a state where the rear end portion of the ball screw 310 is inserted into the coupling unit 542. Accordingly, the carrier 540 may be rotated about the central axis thereof and may transfer the rotational force to the ball screw 310.

The parking gear unit 600 is supplied with the rotational force from the drive unit 200 and is rotated along with the transfer gear unit 400.

Figure 8:
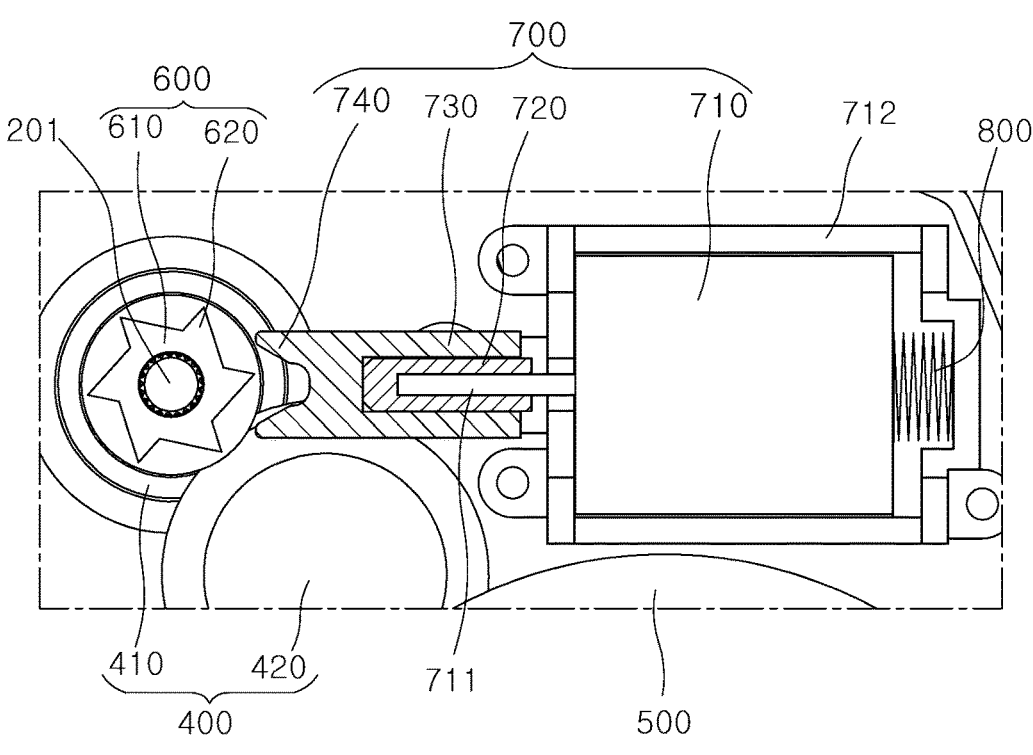
FIG. 8 is a plan view schematically illustrating configurations of a parking gear unit, a locking unit, and an unlocking unit according to the first embodiment of the present disclosure.
Figure 9:
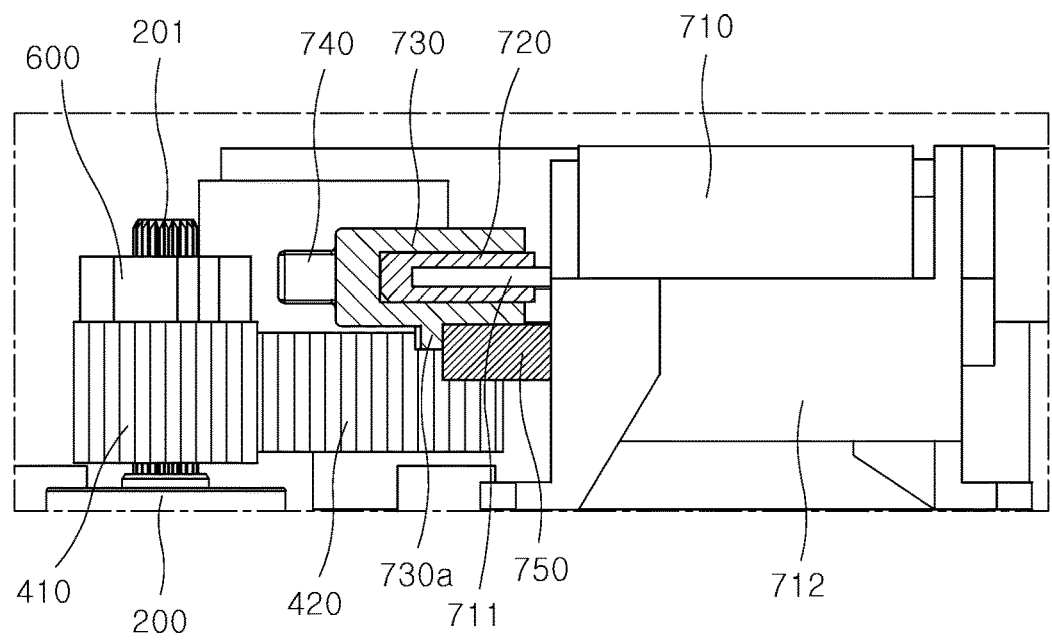
FIG. 9 is a front view schematically illustrating the configurations of the parking gear unit, the locking unit, and the unlocking unit according to the first embodiment of the present disclosure.

FIG. 8 is a plan view schematically illustrating configurations of the parking gear unit 600, the locking unit 700, and the unlocking unit 800 according to the first embodiment of the present disclosure. FIG. 9 is a front view schematically illustrating the configurations of the parking gear unit 600, the locking unit 700, and the unlocking unit 800 according to the first embodiment of the present disclosure.

With reference to FIGS. 8 and 9, the parking gear unit 600 according to the first embodiment includes a parking gear body 610 and a parking protrusion 620.

The parking gear body 610 is connected to the first output shaft of the drive unit 200, thereby being rotated. The parking gear body 610 according to the first embodiment and the first transfer gear 410 are coaxially arranged. The parking gear body 610 according to the first embodiment is inserted into an end portion of the first output shaft 201 of the drive unit 200. When the first output shaft 201 is rotated, the parking gear body 610 may be rotated about the central axis thereof at the same angular speed than the first transfer gear 410. Accordingly, the parking gear body 610 may decrease a magnitude of a load that is to be applied to the locking unit 700 described below more than when the parking gear body 610 is connected to the second transfer gear 420 or the planetary gear unit 500 that has the magnitude of the rotational force that is increased according to a gear ratio.

The parking protrusion 620 protrudes from the parking gear body 610 in such a manner as to possibly interfere with a locking member 740 of the locking unit 700. The parking protrusion 620 according to the first embodiment may be formed in the shape of a protrusion in such a manner as to protrude, toward a radial direction of the parking gear body 610, from an outer circumferential surface of the parking gear body 610. A plurality of parking protrusions 620 are provided and are arranged in such a manner as to be spaced a predetermined distance apart along a circumferential direction of the parking gear body 610. The parking protrusion 620 is not specifically limited to shapes of, and the number, of the parking protrusions illustrated in FIG. 8. The parking protrusion 620 is variously design-changeable in shape and number in such a manner that the locking member 740 described below is combined with the parking protrusion 620 by being trapped thereon.

The locking unit 700 is arranged in a manner that faces the parking gear unit 600 and, before and after braking for parking, is selectively fastened to the parking gear unit 600, thereby limiting or allowing the rotation of the parking gear unit 600. More specifically, when the braking for parking is performed, the locking unit 700 is fastened to the parking gear unit 600 in a state where the piston unit 300 presses against the brake pad 30, and thus limits the rotations of the parking gear unit 600, the transfer gear unit 400, and the planetary gear unit 500. In addition, when the braking for parking is no longer operative, the locking unit 700 is separated from the parking gear unit 600 and thus allows the rotations of the parking gear unit 600, the transfer gear unit 400, and the planetary gear unit 500. Accordingly, although the rotational force stops being generated from the drive unit 200 when the braking for parking is performed, the locking unit 700 may prevent the transfer gear unit 400 and the planetary gear unit 500 from being arbitrarily rotated with reaction forces of the piston unit 300 and the brake pad 30 and thus may prevent absence of the braking force.

The locking unit 700 according to the first embodiment includes a parking drive unit 710, a screw member 720, a locking rod 730, the locking member 740, and a stopper 750.

The parking drive unit 710 is supported on the caliper body 100, more particularly, the assembly unit 140 by being combined therewith, and is supplied with electric power, thereby generating the rotational force. The parking drive unit 710 according to the first embodiment may be exemplified by an electric motor that is electrically connected to the battery or the like of the vehicle and is supplied with electric power, and thus generates a rotational force through an electromagnetic interaction between a stator and a rotor. With an electronic control unit, a user's button operation, or the like, whether or not the rotational force of the parking drive unit 710 is generated may be determined before and after the braking for parking is performed.

A second output shaft 711 is protrusively formed on a front-end portion of the parking drive unit 710. The second output shaft 711 is rotated about the central axis thereof with the rotational force that is generated from the parking drive unit 710. The second output shaft 711 is arranged in such a manner that a longitudinal direction thereof is perpendicular to a longitudinal direction of the first output shaft 201.

The parking drive unit 710 is installed in a manner that is slidably movable in a direction in parallel with a movement direction of the locking rod 730 described below, that is, the longitudinal direction of the second output shaft 711. The parking drive unit 710, as illustrated in FIG. 8, may be installed on the assembly body 150 in a manner that is slidably movable, with the guide bracket 712 provided separately on the assembly body 150 in between, and may also be directly connected to the assembly body 150 in a manner that is slidably movable. The parking drive unit 710, when maximally moved forward or backward, may be brought into contact with both end portions of the guide bracket 712, thereby being limited in the movement range.

The screw member 720 is supplied with the rotational force from the parking drive unit 710, thereby being rotated. The screw member 720 according to the first embodiment may be formed in such a manner as to have the shape of a cylinder that is open at one side thereof. An inner circumferential surface of the screw member 720 is pressed into an outer circumferential surface of the second output shaft 711 in a state where the second output shaft 711 of the parking drive unit 710 is inserted into the screw member 720. Thus, the screw member 720 may be fixed to the second output shaft 711. When the second output shaft 711 is rotated, the screw member 720 is rotated about the central axis thereof, together with the second output shaft 711. The outer circumferential surface of the screw member 720 is threaded along a longitudinal direction of the screw member 720.

The locking rod 730 is combined with the screw member 720 and operates in conjunction with the rotation of the screw member 720. Thus, the locking rod 730 is moved forward and backward in a direction in parallel with the radial direction of the parking gear body 610. The locking rod 730 is formed in such a manner as to have the shape of a cylinder that is open at one side thereof. The screw member 720 is inserted into the locking rod 730. The locking rod 730 is arranged in such a manner that a longitudinal direction thereof is perpendicular to the central axes of the first output shaft 201 and the parking gear body 610. An inner circumferential surface of the locking rod 730 is threaded along the longitudinal direction of the locking rod 730. The inner circumferential surface of the locking rod 730 may be combined with the outer circumferential surface of the screw member 720 in a screw-fastened manner and rotational motion of the screw member 720 may be converted into linear reciprocating motion of the locking rod 730.

A wing portion 730a may be formed on the locking rod 730. The wing portion 730a protrudes, along a radial direction of the locking rod 730, from an outer circumferential surface of the locking rod 730. The wing portion 730a interferes with the stopper 750 described below. Thus, when the screw member 720 is rotated, the wing portion 730a prevents the locking rod 730 from being rotated together with the screw member 720. Accordingly, the wing portion 730a functions as a constituent element that guides smooth linear reciprocating motion of the locking rod 730.

The locking member 740 extends from the locking rod 730. According to the movement direction of the locking rod 730, the locking member 740 is fastened to or separated from the parking protrusion 620, thereby limiting or allowing the rotation of the parking gear unit 600. The locking member 740 according to the first embodiment protrudes toward the parking protrusion 620, from an edge of an end portion of the locking rod 730 facing the parking gear unit 600. A protruding portion of the locking member 740 is design-changeable in length in a manner that varies in a range of lengths where the locking member 740 is separable from the parking protrusion 620 in a state where the parking drive unit 710 is maximally moved forward and where the locking rod 730 is maximally moved backward. A pair of locking member 740 may be provided. The locking members 740 constituting a pair are arranged in such a manner as to face each other in a state of being spaced a distance apart with the central axis of the locking rod 730 in between. When the braking for parking is performed, the locking rod 730 is moved forward toward the parking gear unit 600, and thus, the locking members 740 constituting a pair are combined with the parking protrusions 620, respectively, by being trapped thereon, thereby limiting the rotation of the parking gear unit 600. Accordingly, the locking members 740 may prevent the first output shaft 201, the transfer gear unit 400, and the planetary gear unit 500 from being arbitrarily rotated with the reaction forces of the piston unit 300 and the brake pad 30 when the braking for parking is performed and thus may prevent the absence of the braking force. In addition, when the braking for parking is no longer operative, the locking rod 730 is moved backward away from the parking gear unit 600. Thus, the locking members 740 constituting a pair are separated from the parking protrusions 620, respectively, and allow the rotations of the first output shaft 201, the transfer gear unit 400, and the planetary gear unit 500. The locking member 740 is not specifically limited to a shape illustrated in FIGS. 8 and 9. The locking member 740 is design-changeable in shape in a manner that varies in the scope of the technical idea of the shape in which the locking member 740 is combinable with the parking protrusion 620 by being trapped thereon.

The stopper 750 is brought into contact with the locking rod 730, thereby limiting a rotation of the locking rod 730. More specifically, the stopper 750 is brought into contact with the wing portion 730*a* protruding from the locking rod 730. Thus, the stopper 750 limits the rotation of the locking rod 730 about the central axis thereof due to the rotational force of the screw member 720 and, at the same time, guides the forward and backward movements of the locking rod 730. Accordingly, the stopper 750 may guide the full conversion of the rotational motion of the screw member 720 into the linear reciprocating motion of the locking rod 730. The stopper 750 according to the first embodiment may be formed in the shape of a bar in such a manner as to protrude, toward the parking gear unit 600, from the parking drive unit 710. The stopper 750 may be arranged in such a manner that a longitudinal direction thereof is in parallel with the longitudinal direction of the second output shaft 711. Accordingly, the forward and backward movements of the locking rod 730 may not interfere with the stopper 750. The stopper 750 is supported on a lateral surface of the wing portion 730*a* by being brought into contact therewith. In this case, the wing portion 730*a* may be combined with the stopper 750 by being inserted thereinto. The wing portions 730*a* constituting a pair may be formed and thus may be brought into contact with both lateral sides, respectively, of the wing portion 730*a*. Accordingly, the stopper 750 may bidirectionally limit the rotation of the locking rod 730.

In a state where the parking gear unit 600 and the locking unit 700 are fastened to each other, the rotational force is generated in the reverse direction from the drive unit 200. Thus, the unlocking unit 800 separates the parking gear unit 600 and the locking unit 700 from each other. More specifically, when the braking for parking is no longer operative, in a case where the smooth forward and backward movements of the locking rod 730 are impossible due to the failure of the parking drive unit 710 to operate, the unlocking unit 800 functions as a constituent element that forcefully separates the parking protrusion 620 and the locking member 740 from each other using the rotational force that is generated from the drive unit 200. Accordingly, the unlocking unit 800 may solve the following problem. The parking drive unit 710 that fails to operate keeps the parking gear unit 600 locked, and thus the vehicle is impossible to travel without removal or replacement of the parking drive unit 710 that fails to operate.

The unlocking unit 800 according to the first embodiment may be exemplified by a spring, an elastic body, or the like that is provided in a manner that is expandable and contractable in a longitudinal direction thereof due to elastic deformation. The unlocking unit 800 is connected to a rear end portion of the parking drive unit 710 and presses against the parking drive unit 710 toward the parking gear unit 600.

In a case where a separate outside force is not applied to the unlocking unit 800, with its own elastic force, the unlocking unit 800 keeps the parking drive unit 710 moved maximally forward toward the parking gear unit 600. In this state, a magnitude of an initial elastic force that is applied by the unlocking unit 800 to the parking drive unit 710 may be set to be greater than a force that the parking gear unit 600 exerts on the parking drive unit 710 toward compression direction of the unlocking unit 800, with the rotational force that is generated due to the reaction forces of the piston unit

300 and the brake pad 30. In the case, the direction of the rotational force that is generated due to the reaction forces of the piston unit 300 and the brake pad 30 is exemplified by a direction that is the same as the direction of the rotational force in the reverse direction that is generated from the drive unit 200. Accordingly, the unlocking unit 800 may prevent the parking drive unit 710 from being moved backward with the reaction forces of the piston unit 300 and the brake pad 30 and thus may prevent the parking protrusion 620 and the locking member 740 from being separated from each other.

When the rotational force is generated in the reverse direction from the drive unit 200, the unlocking unit 800 contracts in the longitudinal direction thereof and moves backward the parking drive unit 710 away from the parking gear unit 600. To this end, the magnitude of the initial elastic force that the unlocking unit 800 exerts on the parking drive unit 710 may be set to be smaller than the force that the parking gear unit 600 exerts on the parking drive unit 710 toward compression direction of the unlocking unit 800, with the rotational force in the reverse direction that is generated from the drive unit 200. Accordingly, when the parking drive unit 710 fails to operate, the unlocking unit 800 may also guide the separation of the parking protrusion 620 and the locking member 740, with the rotational force in the reverse direction that is generated from the drive unit 200.

The casing 900 is removably combined with the assembly unit 140 and covers the transfer gear unit 400, the planetary gear unit 500, and the locking unit 700. Accordingly, the casing 900 may block an outside foreign material, such as moisture or dust, from being introduced into the transfer gear unit 400, the planetary gear unit 500, and the locking unit 700. The casing 900 according to the first embodiment may be formed in the shape of cover that is hollow and is open at one side thereof. The casing 900 may be formed in such a manner that a cross section thereof corresponds in shape to a cross section of the assembly body 150. The casing 900 is arranged in such a manner that the open side thereof faces the assembly body 150 and is removably combined with the assembly body 150 using a screw or the like. In this case, an O-ring or the like may be additionally installed between respective contact regions of the assembly body 150 and the casing 900 and may effectively seal up a space inside the casing 900.

A process of operating the brake apparatus for the vehicle 1 according to the first embodiment of the present disclosure will be described in detail below.

Figure 10:
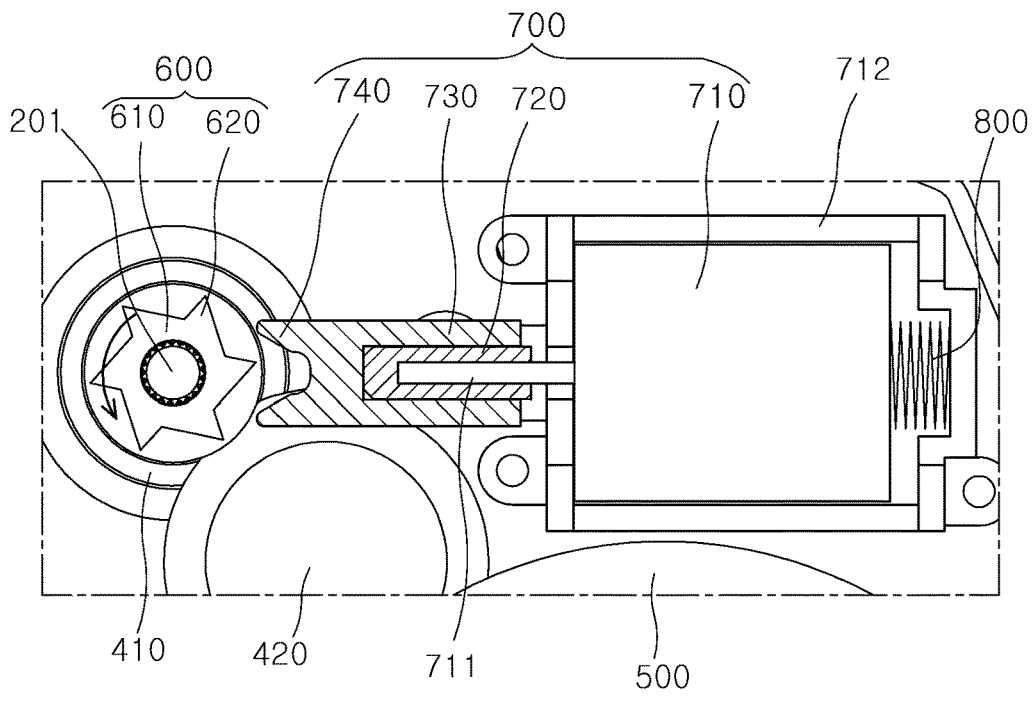
FIGS. 10 to 12 are operational views each schematically illustrating a process of operating the brake apparatus for the vehicle according to the first embodiment of the present disclosure.
Figure 11:
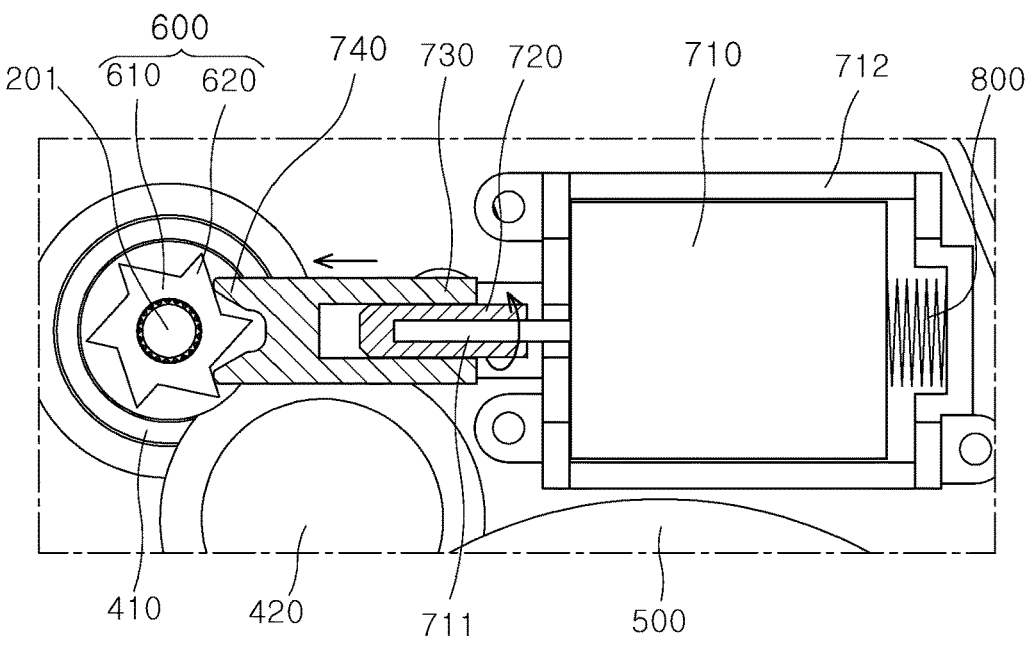
Figure 12:
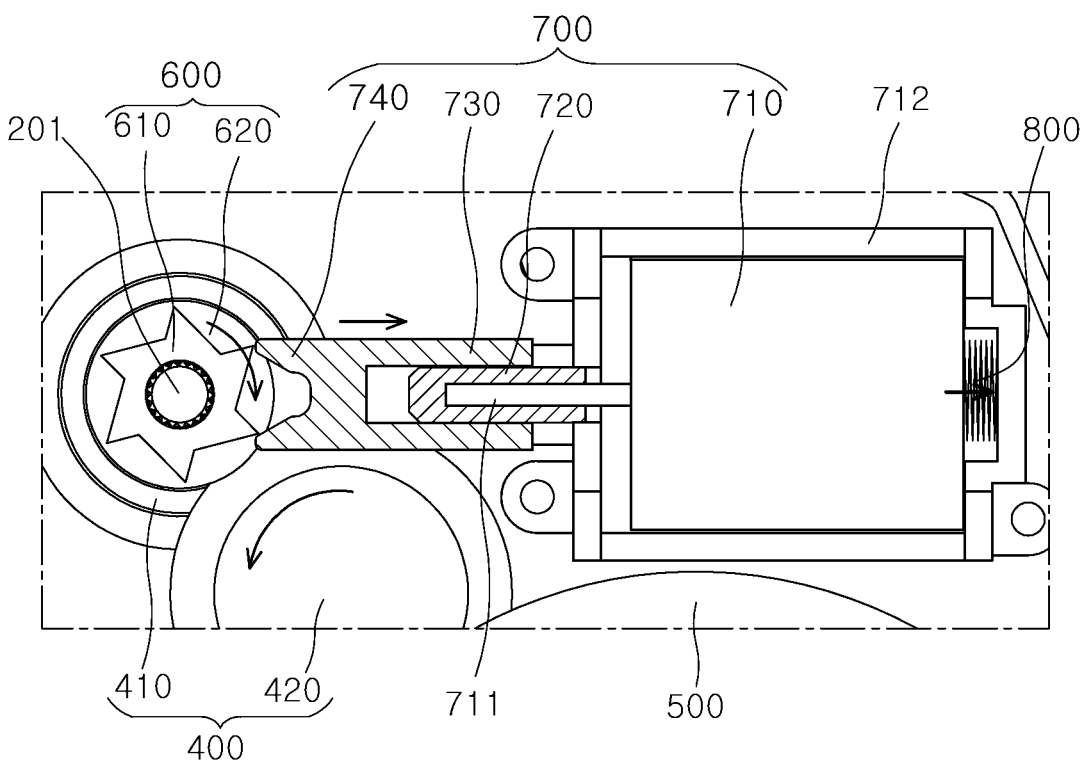

FIGS. 10 to 12 are operational views each schematically illustrating the process of operating the brake apparatus for the vehicle according to the first embodiment of the present disclosure.

With reference to FIG. 10, in a case where the braking force is applied to the vehicle, the drive unit 200 generates the rotational force in the forward direction, and the first output shaft 201 is rotated counterclockwise (as illustrated in FIG. 10).

The rotational force in the forward direction that is generated from the drive unit 200 sequentially passes through the first output shaft 201, the transfer gear unit 400, and the planetary gear unit 500 and then is transferred to the piston unit 300.

The piston unit 300 is moved forward toward the brake pad 30 and thus brings the brake pad 30 into close contact with the brake disc, thereby applying the braking force to the vehicle.

With reference to FIG. 11, in a case where the vehicle is required to perform the braking for parking, the parking drive unit 710 generates the rotational force in a state where the piston unit 300 presses against the brake pad 30.

The rotational force that is generated from the parking drive unit 710 sequentially passes through the second output shaft 711 and the screw member 720 and then is transferred to the locking rod 730, and the locking rod 730 is moved forward toward the parking gear unit 600.

In a case where the locking rod 730 is moved by a predetermined distance or greater forward, the locking member 740 is combined with the parking protrusion 620 by being trapped thereon and thus limits the rotation of the parking gear unit 600.

Since the rotation of the parking gear unit 600 is limited, the rotations of the first output shaft 201, the transfer gear unit 400, and the planetary gear unit 500 that are integrally connected to the parking gear unit 600 are also limited.

A locking force that is generated because the locking member 740 is combined with the parking protrusion 620 by being trapped thereon cancels out the rotational force that is transferred to the parking gear unit 600 due to the reaction forces of the piston unit 300 and the brake pad 30.

Accordingly, although the drive unit 200 stops operating when the engine is turned off or the like, the reaction forces of the piston unit 300 and the brake pad 30 may prevent the absence of the braking force.

With reference to FIG. 12, in a case where the vehicle cannot be kept out of a state of braking for parking because the parking drive unit 710 fails to operate, the drive unit 200 generates the rotational force in the reverse direction.

The rotational force in the reverse direction of the drive unit 200 generates the rotational force that is exerted on the parking gear unit 600 clockwise (as illustrated in FIG. 12).

In order to push the locking member 740, the parking protrusion 620 exerts a greater force on the locking member 740 than the unlocking unit 800 exerts on the parking drive unit 710, and thus compresses the unlocking unit 800 and moves backward the parking drive unit 710.

When the parking drive unit 710 is moved by a predetermined distance or greater, the locking member 740 is separated from the parking protrusion 620.

When the locking member 740 is no longer in a state of being combined with the parking protrusion 620 by being trapped thereon and thus the locking force is no longer exerted, the parking gear unit 600 is rotated clockwise.

The rotational force in the reverse direction that is generated from the drive unit 200 is transferred to the piston unit 300, and thus the piston unit 300 is separated from the brake pad 30, thereby canceling the braking force.

A configuration of a brake apparatus for a vehicle 1' according to a second embodiment of the present disclosure will be described in detail below.

Figure 13:
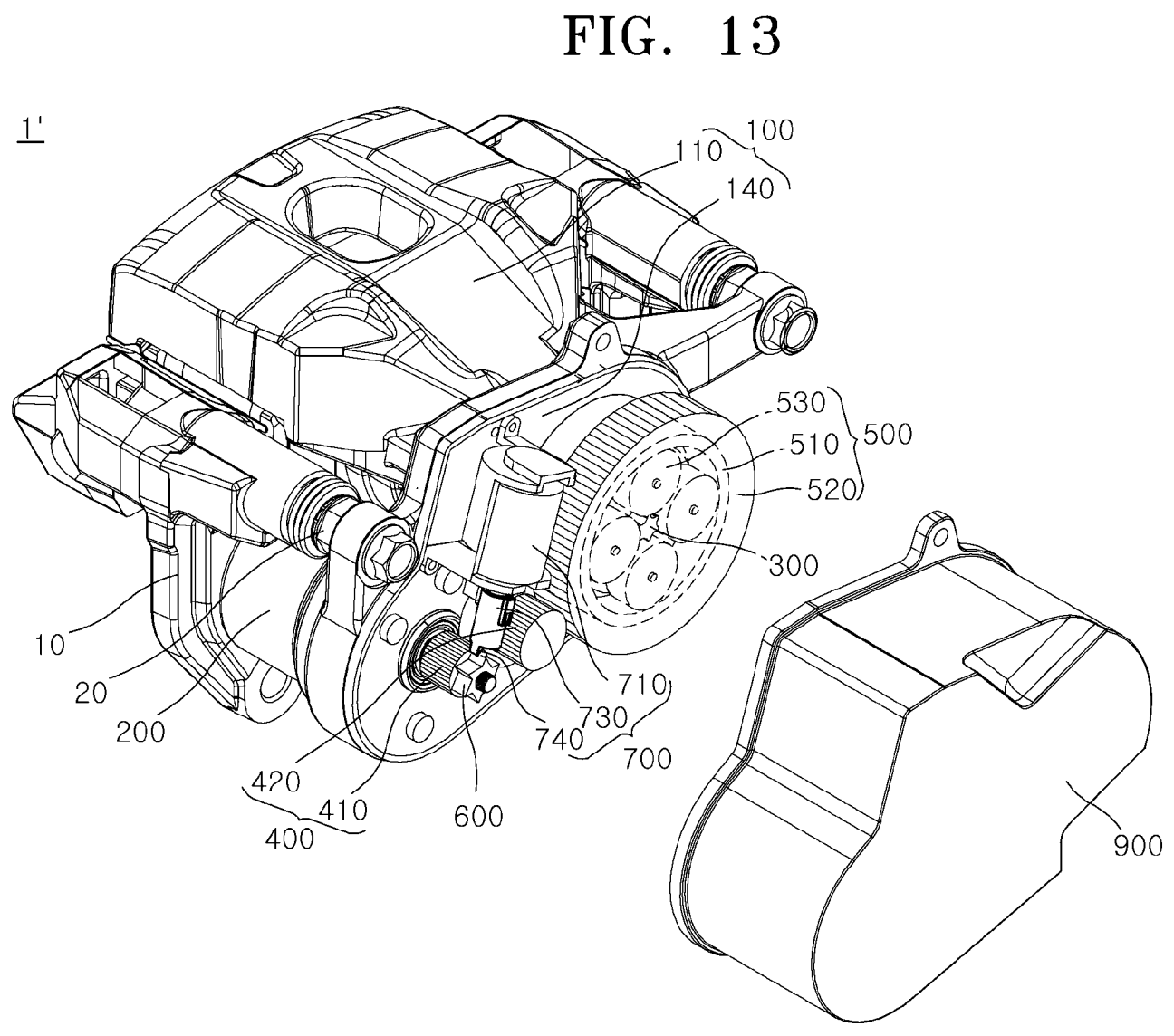
Figure 14:
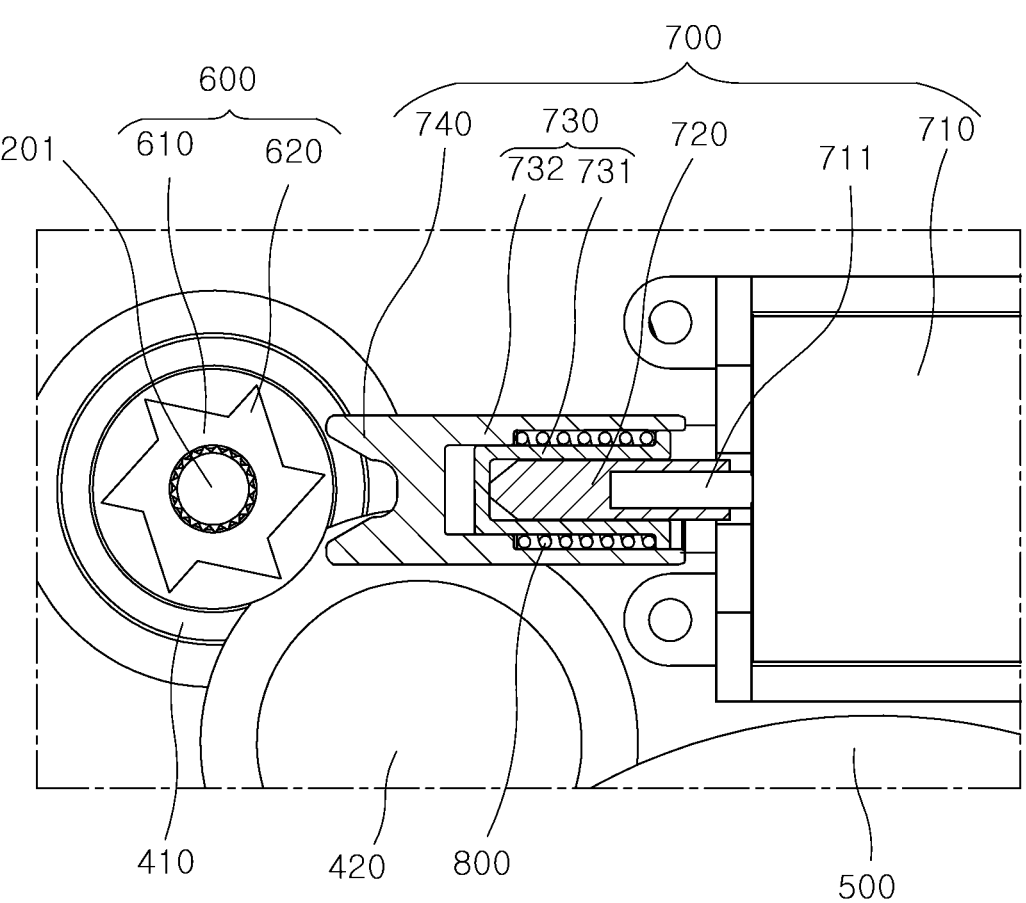
FIG. 14 is a plan view schematically illustrating the configuration of the brake apparatus for the vehicle according to the second embodiment of the present disclosure.
Figure 15:
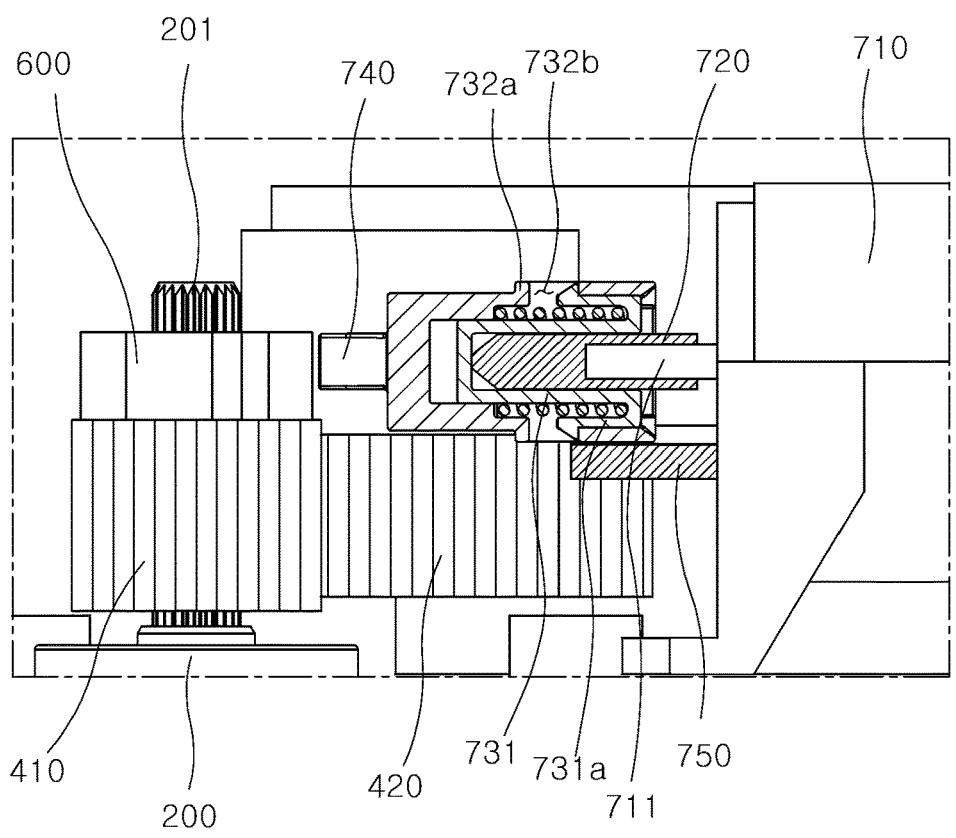
FIG. 15 is a front view schematically illustrating the configuration of the brake apparatus for the vehicle according to the second embodiment of the present disclosure.

FIG. 13 is a perspective view schematically illustrating the configuration of the brake apparatus for the vehicle according to the second embodiment of the present disclosure. FIG. 14 is a plan view schematically illustrating the configuration of the brake apparatus for the vehicle according to the second embodiment of the present disclosure. FIG. 15 is a front view schematically illustrating the configuration of the brake apparatus for the vehicle according to the second embodiment of the present disclosure.

With reference to FIGS. 13 to 15, the brake apparatus for the vehicle 1' for a vehicle according to the second embodiment of the present disclosure includes the caliper body 100, the drive unit 200, the piston unit 300, the transfer gear unit 400, the planetary gear unit 500, the parking gear unit 600, the locking unit 700, the unlocking unit 800, and the casing 900.

The caliper body 100, the drive unit 200, the piston unit 300, the transfer gear unit 400, the planetary gear unit 500, the parking gear unit 600, and the casing 900 that constitute the brake apparatus for the vehicle 1' according to the second embodiment of the present disclosure are the same as those that constitute the brake apparatus for the vehicle 1 according to the first embodiment of the present disclosure, and thus description thereof are omitted for convenience in description. The descriptions of these constituent elements of the brake apparatus for the vehicle 1 according to the first embodiment of the present disclosure apply to the second embodiment of the present disclosure.

Figure 16:
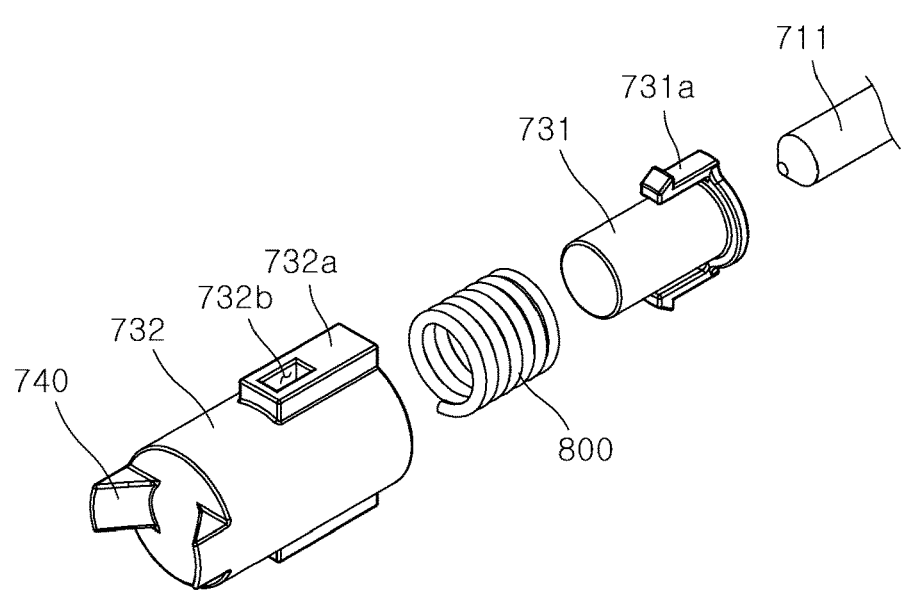
FIG. 16 is an exploded perspective view schematically illustrating configurations of a locking unit and an unlocking unit according to the second embodiment of the present disclosure.

FIG. 16 is an exploded perspective view schematically illustrating configurations of a locking unit 700 and an unlocking unit 800 according to the second embodiment of the present disclosure.

With reference to FIGS. 13 to 16, the locking unit 700 according to the second embodiment includes the parking drive unit 710, the screw member 720, a locking rod 730, the locking member 740, and the stopper 750.

The parking drive unit 710 is supported on the caliper body 100, more particularly, the assembly unit 140 by being combined therewith, and is supplied with electric power, thereby generating the rotational force. The parking drive unit 710 according to the second embodiment may be exemplified by an electric motor that is electrically connected to the battery or the like of the vehicle and is supplied with electric power, and thus generates a rotational force through an electromagnetic interaction between a stator and a rotor. With an electronic control unit, a user's button operation, or the like, whether or not the rotational force of the parking drive unit 710 is generated may be determined before and after the braking for parking is performed. The parking drive unit 710 is combined, by bolting, with the assembly body 150, and thus an installation position thereof is fixed.

The second output shaft 711 is protrusively formed on the front-end portion of the parking drive unit 710. The second output shaft 711 is rotated about the central axis thereof with the rotational force that is generated from the parking drive unit 710. The second output shaft 711 is arranged in such a manner that the longitudinal direction thereof is perpendicular to the longitudinal direction of the first output shaft 201.

The screw member 720 is supplied with the rotational force from the parking drive unit 710, thereby being rotated. The screw member 720 according to the second embodiment may be formed in such a manner as to have the shape of a cylinder that is open at one side thereof. The inner circumferential surface of the screw member 720 is pressed into the outer circumferential surface of the second output shaft 711 in the state where the second output shaft 711 of the parking drive unit 710 is inserted into the screw member 720. Thus, the screw member 720 may be fixed to the second output shaft 711. When the second output shaft 711 is rotated, the screw member 720 is rotated about the central axis thereof, together with the second output shaft 711. The outer circumferential surface of the screw member 720 is threaded along the longitudinal direction of the screw member 720.

The locking rod 730 is combined with the screw member 720 and operates in conjunction with the rotation of the screw member 720. Thus, the locking rod 730 is moved forward and backward in a direction in parallel with the radial direction of the parking gear body 610.

The locking rod 730 includes a first rod 731 and a second rod 732.

The first rod 731 forms an exterior appearance of the inside of the locking rod 730, is combined with the screw member 720, and the rotational motion of the screw member 720 is converted into the linear reciprocating motion of the first rod 731. The first rod 731 is formed in such a manner as to have the shape of a cylinder that is open at one side thereof, and the screw member 720 is inserted into the first rod 731. The first rod 731 is arranged in such a manner that a longitudinal direction thereof is perpendicular to the central axes of the first output shaft 201 and the parking gear body 610. An inner circumferential surface of the first rod 731 is threaded along the longitudinal direction of the first rod 731. The inner circumferential surface of the first rod 731 may be combined with the outer circumferential surface of the screw member 720 in a screw-fastened manner, and the rotational motion of the screw member 720 may be converted into the linear reciprocating motion of the first rod 731. The first rod 731 is formed in such a manner that a rear end portion of the first rod 731 that faces the parking drive unit 710 has a greater diameter than the other portions thereof.

The second rod 732 forms an exterior appearance of the outside of the locking rod 730 and is installed in a manner that is slidably movable along the longitudinal direction of the first rod 731. The second rod 732 according to the second embodiment is formed in such as manner as to have the shape of a cylinder that is open at one side thereof, and the first rod 731 is inserted into the second rod 732. A front-side inner circumferential surface of the second rod 732 is brought into contact with an outer circumferential surface of the first rod 731 in a manner that is slidably movable. The second rod 732 is arranged in such a manner that a rear-side inner circumferential surface thereof is spaced away from the outer circumferential surface of the first rod 731. Accordingly, a space for installing the unlocking unit 800 described below may be formed between the second rod 732 and the first rod 731.

A first guide portion 731a and a second guide portion 732a are formed on the first rod 731 and the second rod 732, respectively. The first guide portion 731a and a second guide portion 732a prevent relative rotations of the first rod 731 and the second rod 732 and, at the same time, guide a sliding movement of the second rod 732.

The first guide portion 731a according to the second embodiment may be formed in the shape of a bar in such a manner as to extend, along the longitudinal direction of the first rod 731, from an edge of a rear end portion of the first rod 731. The first guide portion 731a is formed in such a manner that an end portion thereof protrudes outward from the first rod 731 in a radial direction thereof and has the shape of approximately a stepped jaw. A plurality of first guide portions 731a are provided and are arranged in such a manner as to be spaced a predetermined distance apart along a circumferential direction of the first rod 731.

The second guide portion 732a protrudes, toward the radial direction of the locking rod 730, from an outer circumferential surface of the second rod 732. The second guide portion 732a interferes with the stopper 750 described below. Thus, when the screw member 720 is rotated, the second guide portion 732a prevents the locking rod 730 from being rotated together with the screw member 720. The second guide portion 732a is formed in such a manner as to have a space inside. The first guide portion 731a is seated into the second guide portion 732a and thus is supported thereon. There are formed as many second guide portions 732a as first guide portions 731a. Accordingly, the second guide portions 732a support the first guide portions 731a, respectively.

A trapping hole 732b is provided in the second guide portion 732a. The trapping hole 732b is drilled, in a radial direction of the second rod 732, in the second guide portion 732a. An end portion of the first guide portion 731a that is seated into the second guide portion 732a is inserted into the trapping hole 732b. The trapping hole 732b extends in such a manner that a longitudinal direction thereof is in parallel with a longitudinal direction of the second guide portion 732a. Accordingly, an end portion of the first guide portion 731a is brought into an inner surface of the trapping hole 732b and thus blocks the second rod 732 from being slid by a preset distance or greater along the first rod 731. The trapping hole 732b is formed in such a manner as to have a width corresponding to a width of the end portion of the first guide portion 731a. Accordingly, the trapping hole 732b may be brought into contact with both lateral surfaces of the end portion of the first guide portion 731a and may prevent the relative rotations of the first rod 731 and the second rod 732.

The locking member 740 extends from the locking rod 730. According to the movement direction of the locking rod 730, the locking member 740 is fastened to or separated from the parking protrusion 620, thereby limiting or allowing the rotation of the parking gear unit 600. The locking member 740 according to the second embodiment protrudes toward the parking protrusion 620, from an edge of an end portion of the second rod 732 facing the parking gear unit 600. The protruding portion of the locking member 740 is design-changeable in length in a manner that varies in a range of lengths where the locking member 740 is separable from the parking protrusion 620 in a state where the first rod 731 is maximally moved backward with respect to the screw member 720 and where the second rod 732 is maximally moved forward with respect to the first rod 731. The plurality of locking member 740 may be provided. The locking members 740 constituting a pair are arranged in such a manner as to face each other in a state of being spaced a distance away with the central axis of the second rod 732 in between. When the braking for parking is performed, the locking rod 730 is moved forward toward the parking gear unit 600, and thus, the locking members 740 constituting a pair are combined with the parking protrusions 620, respectively, by being trapped thereon, thereby limiting the rotation of the parking gear unit 600. Accordingly, the locking members 740 may prevent the first output shaft 201, the transfer gear unit 400, and the planetary gear unit 500 from being arbitrarily rotated with the reaction forces of the piston unit 300 and the brake pad 30 when the braking for parking is performed and thus may prevent the absence of the braking force. In addition, when the braking for parking is no longer operative, the locking rod 730 is moved backward away from the parking gear unit 600. Thus, the locking members 740 constituting a pair are separated from the parking protrusions 620, respectively, and allow the rotations of the first output shaft 201, the transfer gear unit 400, and the planetary gear unit 500. The locking member 740 is not specifically limited to the shape illustrated in FIGS. 8 and 9. The locking member 740 is design-changeable in shape in a manner that varies in the scope of the technical idea of the shape in which the locking member 740 is combinable with the parking protrusion 620 by being trapped thereon.

The stopper 750 is brought into contact with the locking rod 730, thereby limiting a rotation of the locking rod 730. More specifically, the stopper 750 is brought into contact with the second guide portion 732a protruding from the second rod 732 and thus blocks the locking rod 730 from being rotated about the central axis thereof with the rotational force of the screw member 720 and guides the forward and backward movements of the locking rod 730.

Accordingly, the stopper 750 may guide the full conversion of the rotational motion of the screw member 720 into the linear reciprocating motion of the locking rod 730. The stopper 750 according to the second embodiment may be formed in the shape of a bar in such a manner as to protrude, toward the parking gear unit 600, from the parking drive unit 710. The stopper 750 may be arranged in such a manner that a longitudinal direction thereof is in parallel with the longitudinal direction of the second output shaft 711. Accordingly, the forward and backward movements of the locking rod 730 may not interfere with the stopper 750. The stopper 750 is supported on a lateral surface of the second guide portion 732a by being brought into contact therewith. In this case, the second guide portion 732a is inserted into the stopper 750, or a pair of the stoppers 750 is formed. The stoppers 750 constituting a pair may be brought into contact with both lateral surfaces, respectively, of the second guide portion 732a. Accordingly, the stopper 750 may bidirectionally limit the rotation of the locking rod 730.

In the state where the parking gear unit 600 and the locking unit 700 are fastened to each other, the rotational force is generated in the reverse direction from the drive unit 200. Thus, the unlocking unit 800 separates the parking gear unit 600 and the locking unit 700 from each other. More specifically, when the braking for parking is no longer operative, in a case where the smooth forward and backward movements of the locking rod 730 are impossible due to the failure of the parking drive unit 710 to operate, the unlocking unit 800 functions as a constituent element that forcefully separates the parking protrusion 620 and the locking member 740 from each other using the rotational force that is generated from the drive unit 200. Accordingly, the unlocking unit 800 may solve the following problem. The parking drive unit 710 that fails to operate keeps the parking gear unit 600 locked, and thus the vehicle is impossible to travel without the removal or the replacement of the parking drive unit 710 that fails to operate.

The unlocking unit 800 according to the first embodiment may be exemplified by a spring, an elastic body, or the like that is provided in a manner that is expandable and contractable in the longitudinal direction thereof due to elastic deformation. The unlocking unit 800 is arranged between the first rod 731 and the second rod 732, and both end portions thereof are supported on the rear end portion of the first rod 731 and an inner surface of the second rod 732, respectively, by being brought into contact therewith. In a case where a separate outside force is not applied to the unlocking unit 800, with its own elastic force, the unlocking unit 800 presses again the second rod 732 toward the parking gear unit 600. In this case, the second rod 732 is kept maximally moved forward toward the parking gear unit 600. In this state, a magnitude of an initial elastic force that the unlocking unit 800 exerts on the second rod 732 may be set to be greater than a force that the parking gear unit 600 exerts on the second rod 732 toward the compression direction of the unlocking unit 800, with the rotational force that is generated due to the reaction forces of the piston unit 300 and the brake pad 30. In this case, the direction of the rotational force that is generated due to the reaction forces of the piston unit 300 and the brake pad 30 is exemplified by a direction that is the same as the direction of the rotational force in the reverse direction that is generated from the drive unit 200. Accordingly, the unlocking unit 800 may prevent the second rod 732 from being moved backward with respect to the first rod 731 with the reaction forces of the piston unit 300 and the brake pad 30 and thus may prevent the parking protrusion 620 and the locking member 740 from being separated from each other.

When the rotational force is generated in the reverse direction from the drive unit 200, the unlocking unit 800 contracts in the longitudinal direction thereof and moves backward the second rod 732 away from the parking gear unit 600. To this end, the magnitude of the initial elastic force that the unlocking unit 800 exerts on the second rod 732 may be set to be smaller than the force that the parking gear unit 600 exerts on the second rod 732 toward the compression direction of the unlocking unit 800, with the rotational force in the reverse direction that is generated from the drive unit 200. Accordingly, when the parking drive unit 710 fails to operate, the unlocking unit 800 may also guide the separation of the parking protrusion 620 and the locking member 740, with the rotational force in the reverse direction that is generated from the drive unit 200.

The brake apparatus for the vehicle 1' according to the second embodiment of the present disclosure will be described in detail below.

Figure 17:
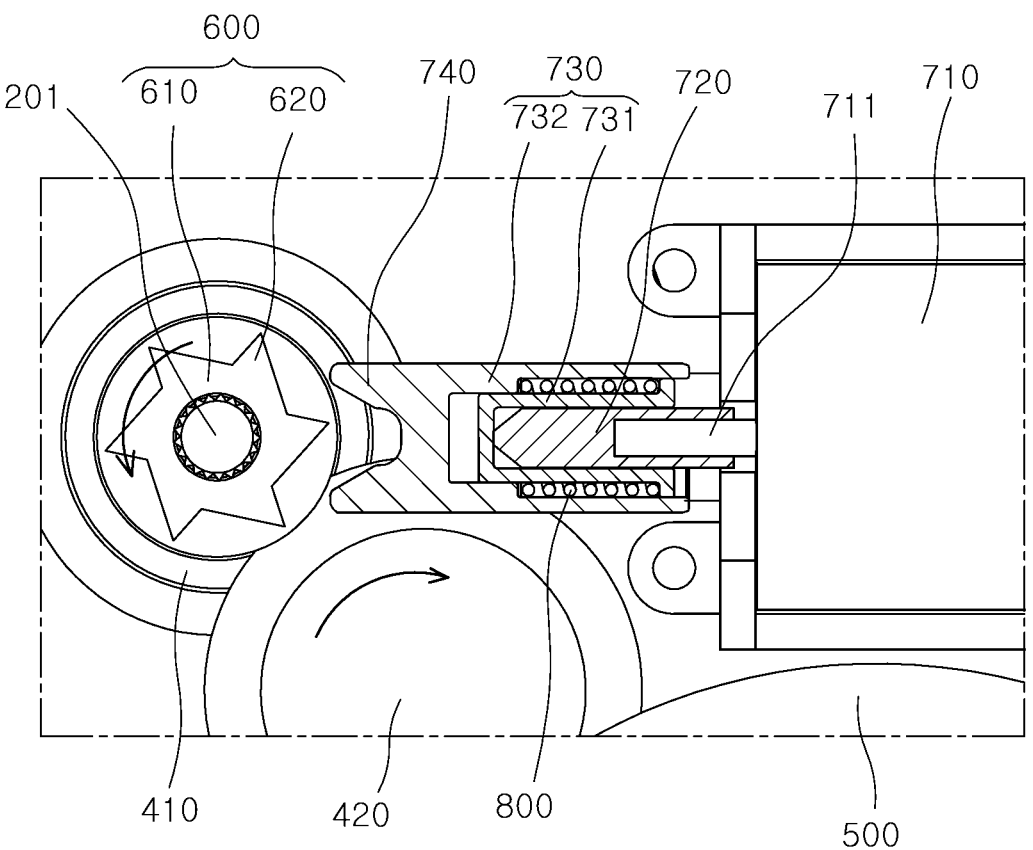
FIGS. 17 to 19 are operational views each schematically illustrating a process of operating the brake apparatus for the vehicle according to the second embodiment of the present disclosure.
Figure 18:
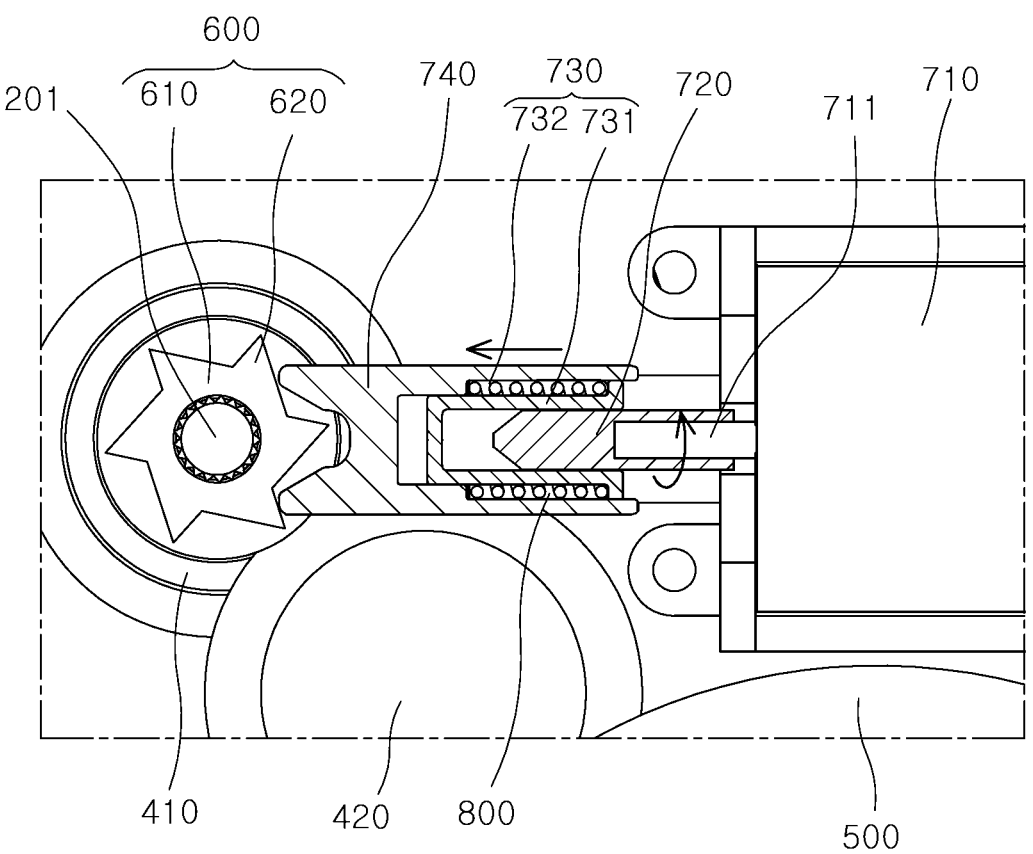
Figure 19:
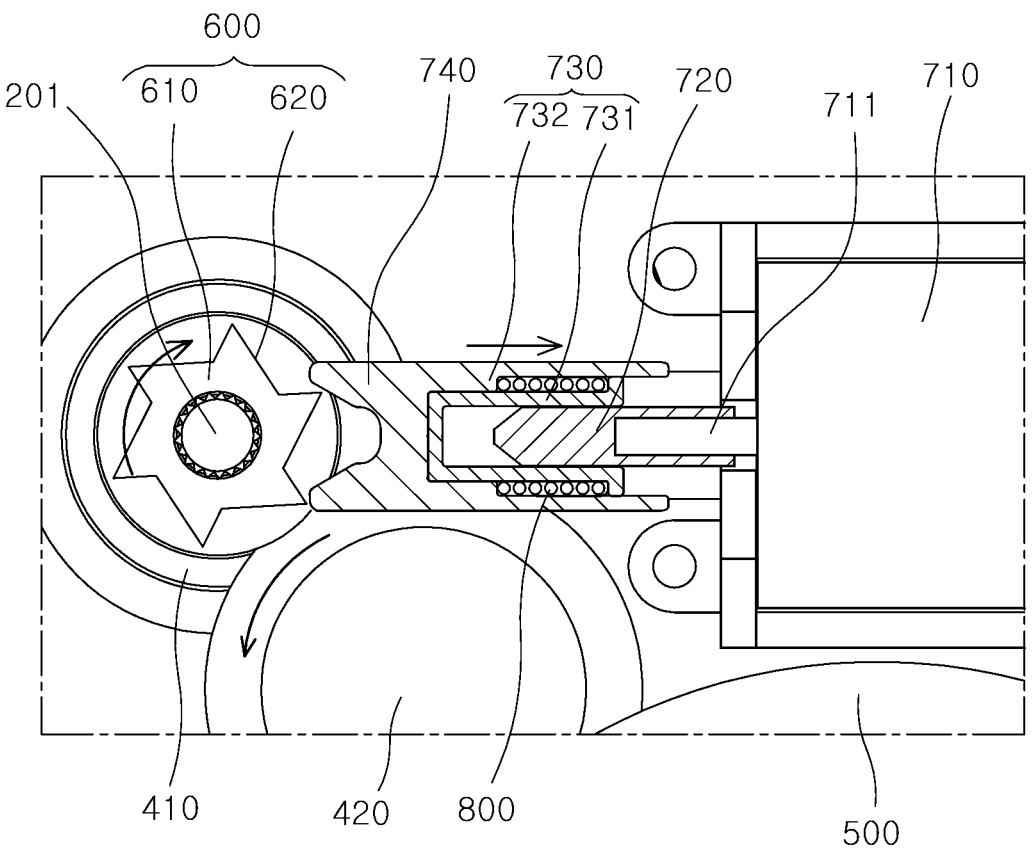

FIGS. 17 to 19 are operational views each schematically illustrating a process of operating the brake apparatus for the vehicle 1' according to the second embodiment of the present disclosure.

With reference to FIG. 17, in the case where the braking force is applied to the vehicle, the drive unit 200 generates the rotational force in the forward direction, and the first output shaft 201 is rotated counterclockwise (as illustrated in FIG. 17).

The rotational force in the forward direction that is generated from the drive unit 200 sequentially passes through the first output shaft 201, the transfer gear unit 400, and the planetary gear unit 500 and then is transferred to the piston unit 300.

The piston unit 300 is moved forward toward the brake pad 30 and thus brings the brake pad 30 into close contact with the brake disc, thereby applying the braking force to the vehicle.

With reference to FIG. 18, in the case where the vehicle is required to perform the braking for parking, the parking drive unit 710 generates the rotational force in the state where the piston unit 300 presses against the brake pad 30.

The braking force that is generated from the parking drive unit 710 sequentially passes through the second output shaft 711 and the screw member 720 and then is transferred to the first rod 731, and the first rod 731 is moved forward toward the parking gear unit 600, together with the second rod 732. In this case, with the elastic force that is applied from the unlocking unit 800, the second rod 732 is prevented from being moved relative to the first rod 731.

In the case where the locking rod 730 is moved by a predetermined distance or greater forward, the locking member 740 is combined with the parking protrusion 620 by being trapped thereon and thus limits the rotation of the parking gear unit 600.

Since the rotation of the parking gear unit 600 is limited, the rotations of the first output shaft 201, the transfer gear unit 400, and the planetary gear unit 500 that are integrally connected to the parking gear unit 600 are also limited.

The locking force that is generated because the locking member 740 is combined with the parking protrusion 620 by being trapped thereon cancels out the rotational force that is transferred to the parking gear unit 600 due to the reaction forces of the piston unit 300 and the brake pad 30.

Accordingly, although the drive unit 200 stops operating when the engine is turned off or the like, the reaction forces of the piston unit 300 and the brake pad 30 may prevent the absence of the braking force.

With reference to FIG. 19, in the case where the vehicle cannot be kept out of the state of braking for parking because the parking drive unit 710 fails to operate, the drive unit 200 generates the rotational force in the reverse direction.

The rotational force in the reverse direction that is generated from the drive unit 200 generates the rotational force that is exerted on the parking gear unit 600 clockwise (as illustrated in FIG. 12).

In order to push the locking member 740 and compress the unlocking unit 800, the parking protrusion 620 exerts a greater force on the locking member 740 than the unlocking unit 800 exerts on the second rod 732, and moves backward the second rod 732 with respect to the first rod 731.

When the second rod 732 is moved backward by a predetermined distance or greater with respect to the first rod 731, the locking member 740 is separated from the parking protrusion 620.

When the locking member 740 is no longer in the state of being combined with the parking protrusion 620 by being trapped thereon and thus the locking force is no longer exerted, the parking gear unit 600 is rotated clockwise.

The rotational force in the reverse direction that is generated from the drive unit 200 is transferred to the piston unit 300, and thus the piston unit 300 is separated from the brake pad 30, thereby canceling the braking force.

A configuration of a brake apparatus for a vehicle 1″ according to a third embodiment of the present disclosure will be described in detail below.

Figure 20:
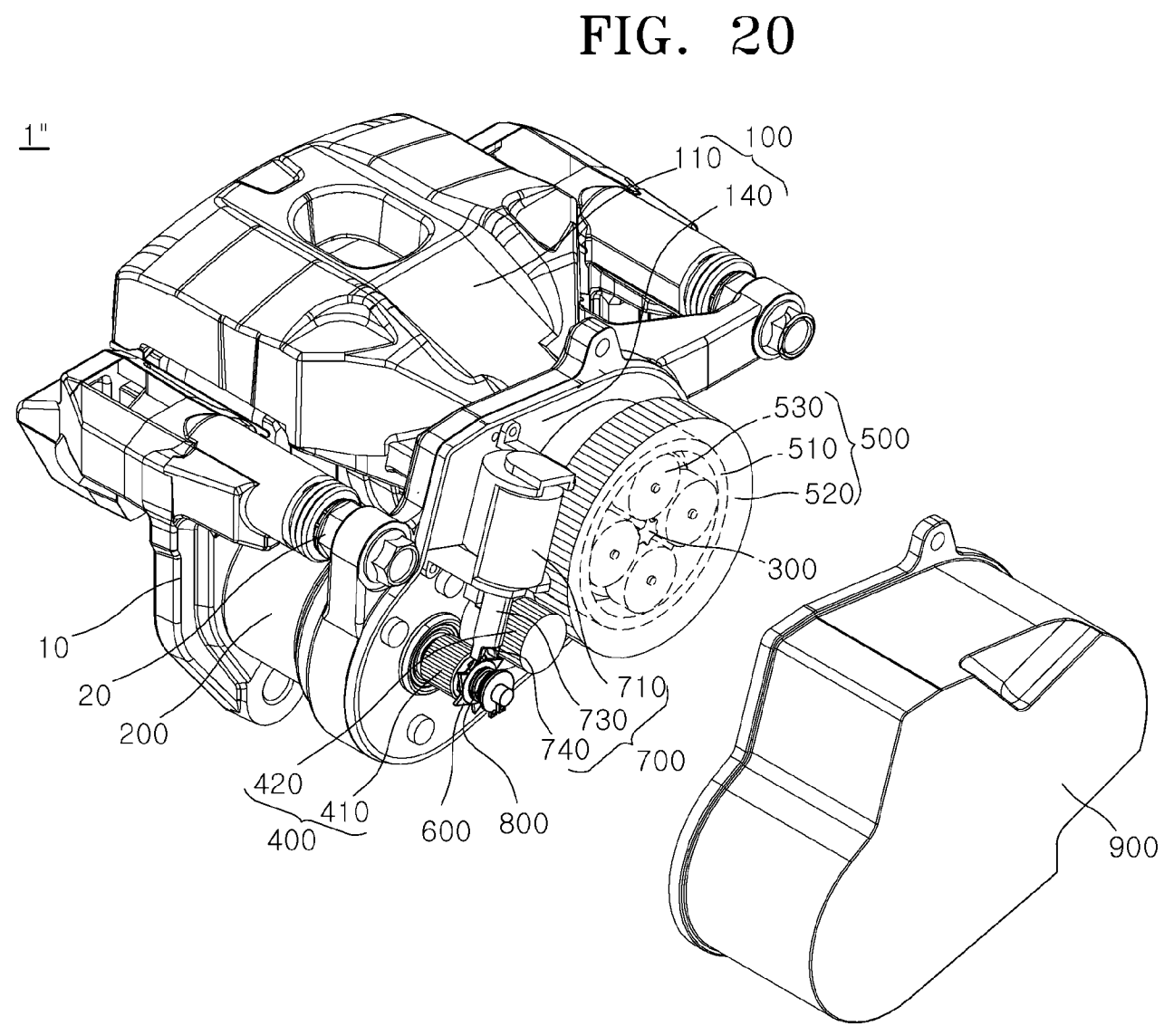

FIG. 20 is a perspective view schematically illustrating the configuration of the brake apparatus for the vehicle 1″ according to the third embodiment of the present disclosure. FIG. 21 is a plan view schematically illustrating the configuration of the brake apparatus for the vehicle 1″ according to the third embodiment of the present disclosure. FIG. 22 is a plan view schematically illustrating the configuration of the brake apparatus for the vehicle 1″ according to the third embodiment of the present disclosure.

With reference to FIGS. 20 to 22, the brake apparatus for the vehicle 1″ includes the caliper body 100, the drive unit 200, the piston unit 300, the transfer gear unit 400, the planetary gear unit 500, the parking gear unit 600, the locking unit 700, the unlocking unit 800, and the casing 900.

The caliper body 100, the drive unit 200, the piston unit 300, the transfer gear unit 400, the planetary gear unit 500, and the casing 900 that constitute the brake apparatus for the vehicle 1″ according to the third embodiment of the present disclosure are the same as those that constitute the brake apparatus for the vehicle 1 according to the first embodiment of the present disclosure, and thus description thereof are omitted for convenience in description. The descriptions of these constituent elements of the brake apparatus for the vehicle 1 according to the first embodiment of the present disclosure apply to the second embodiment of the present disclosure.

FIG. 23 is an exploded perspective view schematically illustrating configurations of a parking gear unit 600, a locking unit 700, and an unlocking unit 800 according to the third embodiment of the present disclosure.

With reference to FIGS. 20 to 23, the parking gear unit 600 according to the third embodiment includes the parking gear body 610, the parking protrusion 620, and a first saw-toothed portion 630.

The parking gear body 610 is connected to the first output shaft 201 of the drive unit 200, thereby being rotated. The parking gear body 610 according to the third embodiment and the first transfer gear 410 are coaxially arranged. An inner circumferential surface of the parking gear body 610 according to the third embodiment is arranged in such a manner as to be spaced a predetermined distance away from an outer circumferential surface of the first output shaft 201. The parking gear body 610 is connected, by the unlocking unit 800 described below, to the first output shaft 201. When the first output shaft 201 is rotated, the parking gear body 610 may be rotated about the central axis thereof at the same angular speed as the first transfer gear 410, together with the first output shaft 201. Accordingly, the parking gear body 610 may decrease the magnitude of the load that is to be applied to the locking unit 700 described below more than when the parking gear body 610 is connected to the second transfer gear 420 or the planetary gear unit 500 that has the magnitude of the rotational force that is increased according to the gear ratio. The parking gear body 610 is installed in a manner that is slidably movable along the longitudinal direction of the first output shaft 201.

The parking protrusion 620 protrudes from the parking gear body 610 in such a manner as to possibly interfere with the locking member 740 of the locking unit 700. The parking protrusion 620 according to the third embodiment may be formed in the shape of a protrusion in such a manner as to protrude, toward the radial direction of the parking gear body 610, from the outer circumferential surface of the parking gear body 610. The plurality of parking protrusions 620 are provided and are arranged in such a manner as to be spaced a predetermined distance apart along the circumferential direction of the parking gear body 610. The parking protrusions 620 is not specifically limited to shapes of, and the number, of the parking protrusions 620 illustrated in FIG. 23. The parking protrusion 620 is variously design-changeable in shape and number in such a manner that the locking member 740 described below is combined with the parking protrusion 620 by being trapped thereon.

The first saw-toothed portion 630 protrudes, along an axial direction of the parking gear body 610, downward from a lower surface of the parking gear body 610. A plurality of first saw-toothed portions 630 are provided and are arranged in such a manner as to be spaced a predetermined distance apart along the circumferential direction of the parking gear body 610. A width of the first saw-toothed portion 630 becomes smaller toward an end thereof. The first saw-toothed portion 630 is formed in such a manner that both lateral surfaces thereof are inclined at a predetermined angle with respect to the longitudinal direction of the first output shaft 201. That is, as illustrated in FIG. 22, the first saw-toothed portion 630 may be formed in such a manner as to have the shape of approximately a trapezoidal cross section.

The locking unit 700 according to the third embodiment includes the parking drive unit 710, the screw member 720, the locking rod 730, the locking member 740, and the stopper 750.

The parking drive unit 710 is supported on the caliper body 100, more particularly, the assembly unit 140 by being combined therewith, and is supplied with electric power, thereby generating the rotational force. The parking drive unit 710 according to the third embodiment may be exemplified by an electric motor that is electrically connected to the battery or the like of the vehicle and is supplied with electric power, and thus generates a rotational force through an electromagnetic interaction between a stator and a rotor.

With an electronic control unit, a user's button operation, or the like, whether or not the rotational force of the parking drive unit 710 is generated may be determined before and after the braking for parking is performed. The parking drive unit 710 is combined, by bolting, with the assembly body 150, and thus an installation position thereof is fixed.

The second output shaft 711 is protrusively formed on the front-end portion of the parking drive unit 710. The second output shaft 711 is rotated about the central axis thereof with the rotational force that is generated from the parking drive unit 710. The second output shaft 711 is arranged in such a manner that the longitudinal direction thereof is perpendicular to the longitudinal direction of the first output shaft 201.

The screw member 720, the locking rod 730, the locking member 740, and the stopper 750 according to the third embodiment of the present disclosure are configured in the same manner as the screw member 720, the locking rod 730, the locking member 740, and the stopper 750, respectively, according to the first embodiment of the present disclosure, and thus detailed descriptions thereof are omitted.

In the state where the parking gear unit 600 and the locking unit 700 are fastened to each other, the rotational force is generated in the reverse direction from the drive unit 200. Thus, the unlocking unit 800 separates the parking gear unit 600 and the locking unit 700 from each other. More specifically, when the braking for parking is no longer operative, in the case where the smooth forward and backward movements of the locking rod 730 are impossible due to the failure of the parking drive unit 710 to operate, the unlocking unit 800 functions as a constituent element that forcefully separates the parking protrusion 620 and the locking member 740 from each other using the rotational force in the reverse direction that is generated from the drive unit 200. Accordingly, the unlocking unit 800 may solve the following problem. The parking drive unit 710 that fails to operate keeps the parking gear unit 600 locked, and thus the vehicle is impossible to travel without the removal or the replacement of the parking drive unit 710 that fails to operate.

The unlocking unit 800 according to the third embodiment includes a locking limitation body 810, a second saw-toothed portion 820, and a pressing unit 830.

The locking limitation body 810 is connected to the first output shaft 201, thereby being rotated, and supports the parking gear body 610 in a manner that is slidably movable in a direction in parallel with the longitudinal direction of the first output shaft 201. The locking limitation body 810 according to the third embodiment may be formed in such a manner as to have the shape of a cylinder that is open at both sides thereof. The locking limitation body 810 is arranged between the parking gear body 610 and the first output shaft 201, and an inner circumferential surface thereof is integrally fixed to the outer circumferential surface of the first output shaft 201. An outer circumferential surface of the locking limitation body 810 is brought into contact with an inner circumferential surface of the parking gear body 610, and the locking limitation body 810 supports the parking gear body 610 in a manner that is slidably movable in a direction parallel with the longitudinal direction of the first output shaft 201. The locking limitation body 810 is formed in the shape of a circular plate in such a manner that a lower end portion of the locking limitation body 810 has a greater diameter than the other portions thereof. The locking limitation body 810 is arranged in such a manner that a lower end portion thereof faces the first saw-toothed portion 630 in a parallel manner.

The second saw-toothed portion 820 protrudes, along an axial direction of the locking limitation body 810, upward from an upper surface of the lower end portion of the locking limitation body 810. A width of the second saw-toothed portion 820 becomes smaller toward an end thereof. The second saw-toothed portion 820 is formed in such a manner that both lateral surfaces thereof are inclined at a predetermined angle with respect to the longitudinal direction of the first output shaft 201. That is, as illustrated in FIG. 22, the second saw-toothed portion 820 may be formed in such a manner as to have approximately a trapezoidal cross section. The second saw-toothed portion 820 is combined with the first saw-toothed portion 630 by being engaged therewith and transfers the rotational force of the first output shaft 201 to the parking gear body 610.

When the drive unit 200 generates the rotational force in the reverse direction in a state where the parking protrusion 620 is brought into contact with the locking member 740, the second saw-toothed portion 820 is disengaged from the first saw-toothed portion 630, moves upward the parking gear body 610 in a slidable manner, and separates the parking protrusion 620 and the locking member 740 from each other in a direction that is in parallel with an axial direction of the first output shaft 201. In this case, when the parking gear body 610 and the locking limitation body 810 are rotated relative to each other, the first saw-toothed portion 630 and the second saw-toothed portion 820 may be smoothly engaged from each other due to the trapezoidal cross section of the second saw-toothed portion 820.

The pressing unit 830 presses against the parking gear body 610 toward the locking limitation body 810. The pressing unit 830 according to the third embodiment may be exemplified by a spring, an elastic body, or the like that is provided in a manner that is expandable and contractable in a longitudinal direction thereof due to elastic deformation. Both end portions of the pressing unit 830 are spaced away from an upper surface of the parking gear body 610 and the parking gear body 610, respectively, and are supported on a lower surface of a pressing sheet 840 fixed to the first output shaft 201 by being brought into contact therewith. When the parking drive unit 710 operates normally, with its own elastic force, the pressing unit 830 presses against the parking gear body 610 in the downward direction and thus keeps the first saw-toothed portion 630 and the second saw-toothed portion 820 engaged with each other.

A process of operating the brake apparatus for the vehicle 1" according to the third embodiment of the present disclosure will be described below.

FIGS. 24 to 26 are operational views each schematically illustrating the process of operating the brake apparatus for the vehicle 1" according to the third embodiment of the present disclosure.

With reference to FIG. 24, in a case where the braking force is applied to the vehicle, the drive unit 200 generates the rotational force in the forward direction, and the first output shaft 201 is rotated counterclockwise (as illustrated in FIG. 24).

The rotational force in the forward direction that is generated from the drive unit 200 sequentially passes through the first output shaft 201, the transfer gear unit 400, and the planetary gear unit 500 and then is transferred to the piston unit 300.

The piston unit 300 is moved forward toward the brake pad 30 and thus brings the brake pad 30 into close contact with the brake disc, thereby applying the braking force to the vehicle.

With reference to FIG. 25, in the case where the vehicle is required to perform the braking for parking, the parking drive unit 710 generates the rotational force in the state where the piston unit 300 presses against the brake pad 30.

The rotational force that is generated from the parking drive unit 710 sequentially passes through the second output shaft 711 and the screw member 720 and then is transferred to the locking rod 730, and the locking rod 730 is moved forward toward the parking gear unit 600.

In the case where the locking rod 730 is moved by a predetermined distance or greater forward, the locking member 740 is combined with the parking protrusion 620 by being trapped thereon and thus limits the rotation of the parking gear unit 600.

Since the rotation of the parking gear unit 600 is limited, the rotations of the first output shaft 201, the transfer gear unit 400, and the planetary gear unit 500 that are integrally connected to the parking gear unit 600 are also limited.

In this case, the pressing by the pressing unit 830 keeps the first saw-toothed portion 630 and the second saw-toothed portion 820 engaged with each other, and thus, relative rotations of the parking gear body 610 and the first output shaft 201 may be prevented.

The locking force that is generated because the locking member 740 is combined with the parking protrusion 620 by being trapped thereon cancels out the rotational force that is transferred to the parking gear unit 600 due to the reaction forces of the piston unit 300 and the brake pad 30.

Accordingly, although the drive unit 200 stops operating when the engine is turned off or the like, the reaction forces of the piston unit 300 and the brake pad 30 may prevent the absence of the braking force.

With reference to FIG. 26, in the case where the vehicle cannot be kept out of the state of braking for parking because the parking drive unit 710 fails to operate, the drive unit 200 generates the rotational force in the reverse direction.

The rotational force in the reverse direction that is generated from the drive unit 200 generates the rotational force that is exerted on the locking limitation body 810 (as illustrated in FIG. 12).

Since the locking member 740 is combined with the parking protrusion 620 by being trapped thereon, a movement of the parking gear unit 600 is limited. Thus, a torsional force occurs between the first saw-toothed portion 630 and the second saw-toothed portion 820.

The torsional force causes the relative rotations of the parking gear body 610 and the locking limitation body 810, and the first saw-toothed portion 630 and the second saw-toothed portion 820 are disengaged from each other.

In this case, when the parking gear body 610 and the locking limitation body 810 are rotated relative to each other, the first saw-toothed portion 630 and the second saw-toothed portion 820 may be smoothly engaged from each other due to the trapezoidal cross section of the second saw-toothed portion 820.

When the first saw-toothed portion 630 and the second saw-toothed portion 820 are arranged in such a manner as to be disengaged from each other, the parking gear body 610 is moved upward along the longitudinal direction of the first output shaft 201.

When the parking gear body 610 is moved upward by a predetermined distance or greater, the parking protrusion 620 is arranged toward the longitudinal direction of the first output shaft 201 in such a manner that the locking member 740 is released from the parking protrusion 620. The parking protrusion 620 and the locking member 740 are separated from each other.

The locking force that is generated because the locking member 740 is combined with the parking protrusion 620 by being trapped thereon is canceled, and thus the first output shaft 201 is rotated clockwise.

The rotational force in the reverse direction that is generated from the drive unit 200 is transferred to the piston unit 300, and thus the piston unit 300 is separated from the brake pad 30, thereby canceling the braking force.

The embodiments of the present disclosure are described only in an exemplary manner with reference to the drawings. It would be understandable to a person of ordinary skill in the art to which the present disclosure pertains that various modifications may possibly be made to the embodiments and that various equivalents thereof may possibly be implemented. Thus, the proper technical scope of the present disclosure should be defined by the following claims.

What is claimed is:

1. A brake apparatus for a vehicle, comprising:
a drive unit configured to generate a rotational force in a first rotational direction or a second rotational direction opposite to the first rotational direction;
a piston unit configured to move forward or backward in response to receiving the rotational force from the drive unit;
a transfer gear unit configured to transfer, to the piston unit, the rotational force from the drive unit;
a parking gear unit configured to rotate along with the transfer gear unit, the parking gear unit including a parking protrusion;
a locking unit facing the parking gear unit and including a parking drive unit and a locking member, the parking drive unit being configured to move the locking member into engagement with the parking protrusions of the parking gear unit to limit a rotation of the parking gear unit; and
an unlocking unit configured to enable the locking member of the locking unit to be moved apart from the parking protrusion of the parking gear unit in response to the rotational force being generated in the second rotational direction from the drive unit,
wherein:
the parking drive unit is configured to slidably move in a direction parallel to the reciprocal axis of the locking rod, and
the unlocking unit is connected to the parking drive unit and configured to longitudinally expand or contract to selectively press the parking drive unit toward the parking gear unit.

2. The brake apparatus of claim 1, wherein:
the drive unit comprises a first output shaft, and
the parking gear unit comprises:
a parking gear body coupled to the first output shaft of the drive unit and configured to rotate in response to receiving the rotational force from the drive unit; and
a plurality of parking protrusions radially protruding from a circumferential surface of the parking gear body and spaced apart from each other.

3. The brake apparatus of claim 2, wherein the parking gear body and the first output shaft are coaxial.

4. The brake apparatus of claim 2, wherein the locking unit comprises:
a screw member configured to rotate in response to receiving the rotational force from the parking drive unit;
a locking rod configured to reciprocate along a reciprocal axis parallel to a rotational axis of the parking gear body in response to rotation of the screw member; and wherein the locking member extends from the locking rod and is configured to selectively engage the parking protrusion in response to reciprocation of the locking rod.

5. The brake apparatus of claim 4, wherein the locking unit further comprises a stopper configured to selectively contact the locking rod to limit rotation of the locking rod.

6. The brake apparatus of claim 1, wherein, in response to receiving the rotational force in the second rotational direction from the drive unit, the unlocking unit is configured to contract and move the parking drive unit away from the parking gear unit.

7. The brake apparatus of claim 1, wherein the piston unit comprises:

a ball screw configured to rotate in response to rotating of the transfer gear unit;

a ball nut connected to the ball screw and configured to reciprocate along a rotational axis of the ball screw; and one or more balls disposed between and in contact with the ball screw and the ball nut.

* * * * *